US010765951B2

(12) United States Patent
Kishimoto et al.

(10) Patent No.: US 10,765,951 B2
(45) Date of Patent: Sep. 8, 2020

(54) GAME SYSTEM, GAME CONTROL DEVICE, AND INFORMATION STORAGE MEDIUM

(71) Applicant: KONAMI DIGITAL ENTERTAINMENT CO., LTD., Tokyo (JP)

(72) Inventors: Mitsuhiro Kishimoto, Tokyo (JP); Masanori Kono, Tokyo (JP); Kiyoshi Tada, Tokyo (JP); Junichiro Tsubaki, Kakogawa (JP); Mitsuhiro Nozaki, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 43 days.

(21) Appl. No.: 15/924,276

(22) Filed: Mar. 19, 2018

(65) Prior Publication Data
US 2018/0207537 A1    Jul. 26, 2018

Related U.S. Application Data

(63) Continuation of application No. PCT/JP2016/067514, filed on Jun. 13, 2016.

(30) Foreign Application Priority Data

Sep. 30, 2015 (JP) ................. 2015-194067

(51) Int. Cl.
*A63F 13/79* (2014.01)
*A63F 13/812* (2014.01)
(Continued)

(52) U.S. Cl.
CPC .............. *A63F 13/79* (2014.09); *A63F 13/30* (2014.09); *A63F 13/53* (2014.09); *A63F 13/58* (2014.09);
(Continued)

(58) Field of Classification Search
CPC .......... A63F 13/58; A63F 13/63; A63F 13/79; A63F 13/69
See application file for complete search history.

(56) References Cited

U.S. PATENT DOCUMENTS 6,884,163 B2 * 4/2005 Namba ................... A63F 13/12
                                                                            463/1
9,005,032 B1 * 4/2015 Curtis .................... A63F 13/12
                                                                            463/42
(Continued)

FOREIGN PATENT DOCUMENTS

CN     104125851 A    10/2014
JP     2002-248264 A   9/2002
(Continued)

OTHER PUBLICATIONS

Office Action dated Jul. 16, 2019 and English translation, for corresponding JP Patent Application No. 2018-132870; see pp. 1-7.
(Continued)

*Primary Examiner* — Chase E Leichliter
(74) *Attorney, Agent, or Firm* — HEA Law PLLC

(57) ABSTRACT

Provided is a game system including at least one processor configured to: select at least one game object from a plurality of selection candidate game objects, as a game object to be associated with first user identification information, based on predetermined lottery processing; associate the selected game object with the first user identification information; and set, as one of the plurality of selection candidate game objects, a game object which is associated with second user identification information and generated based on a game play by a second user who is identified by the second user identification information.

13 Claims, 16 Drawing Sheets

(51) Int. Cl.
*A63F 13/30* (2014.01)
*A63F 13/53* (2014.01)
*A63F 13/69* (2014.01)
*A63F 13/63* (2014.01)
*A63F 13/58* (2014.01)
*G07F 17/32* (2006.01)
*A63F 13/822* (2014.01)
*A63F 13/828* (2014.01)

(52) U.S. Cl.
CPC .............. *A63F 13/63* (2014.09); *A63F 13/69* (2014.09); *A63F 13/812* (2014.09); *G07F 17/326* (2013.01); *A63F 13/822* (2014.09); *A63F 13/828* (2014.09); *A63F 2300/50* (2013.01); *G07F 17/329* (2013.01)

(56) References Cited

U.S. PATENT DOCUMENTS

| | | | | |
|---|---|---|---|---|
| 9,792,825 | B1* | 10/2017 | Fanty | G09B 5/125 |
| 2008/0274806 | A1* | 11/2008 | Ganz | A63F 13/12 463/31 |
| 2011/0263306 | A1* | 10/2011 | Nakamura | G06Q 30/0258 463/4 |
| 2013/0116052 | A1* | 5/2013 | Okada | A63F 13/10 463/42 |
| 2014/0364194 | A1* | 12/2014 | Kusano | A63F 13/35 463/22 |
| 2017/0173459 | A1* | 6/2017 | Mills | G07F 17/322 |
| 2018/0093187 | A1* | 4/2018 | Mabuchi | A63F 13/69 |

FOREIGN PATENT DOCUMENTS

| | | |
|---|---|---|
| JP | 2003-210826 A | 7/2003 |
| JP | 2009-119049 A | 6/2009 |
| JP | 2013-169431 A | 9/2013 |
| JP | 2014-090742 A | 5/2014 |
| JP | 2014-188328 A | 10/2014 |

OTHER PUBLICATIONS

English translation of the International Search Report for PCT/JP2016/067514 and English translation thereof.

English Translation of Written Opinion of the International Searching Authority for PCT/JP2016/067514 accompanied with PCT/IB/373 and PCT/IB/338 dated Apr. 12, 2018.

Office Action dated Nov. 2, 2017, for corresponding JP Patent Application No. 2015-194067 and computer generated English translation thereof.

Office Action dated Feb. 20, 2018, for corresponding JP Patent Application No. 2015-194067 and computer generated English translation thereof.

Super Mario Maker : Playing guide : Playing, Nouveoni (Sep. 12, 2020), Internet <URL:http://web.archive.org/web/20150912163649/https://www.nintendo.co.jp/wiiu/amaj/guide/page_06.html#touch> (newly cited document), Internet <WayBackMachine)[online],2015> (newly cited document) [1, Jan. 2006, 23]. (See Computer generated English translation of the Office Action.).

Office Action dated Feb. 4, 2020, for corresponding JP Patent Application No. 2018-132870.

* cited by examiner

FIG.7

| USER ID | FIRST GAME POINT | FIRST GAME ITEM |
|---------|------------------|-----------------|
| U1 | 120 | FI1, ··· |
| U2 | 100 | FI2, ··· |
| U3 | 90 | FI1, ··· |
| U4 | 150 | FI3, ··· |
| ··· | ··· | ··· |

TBL101

FIG.8

| FIRST PLAYER CHARACTER ID | CREATOR | NAME | POSITION | OVERALL CAPACITY | ... | BASIC ABILITY PARAMETER | | SPECIAL ABILITY PARAMETER | | | LOTTERY CANDIDATE FLAG |
|---|---|---|---|---|---|---|---|---|---|---|---|
| | | | | | | TRAJECTORY | ... | CHANCE ○ | CHANCE ◎ | ... | |
| FC1 | U1 | TANAKA | 1B | C | ... | 3 | ... | 0 | 1 | ... | 1 |
| FC2 | U1 | SUZUKI | CATCHER | C | ... | 3 | ... | 1 | 0 | ... | 0 |
| FC3 | U1 | SATO | PICHER | D | ... | 2 | ... | 0 | 0 | ... | 0 |
| FC4 | U1 | TAKAHASHI | OF | E | ... | 2 | ... | 0 | 1 | ... | 0 |
| FC5 | U3 | WATANABE | 3B | B | ... | 4 | ... | 0 | 1 | ... | 1 |
| ... | ... | ... | ... | ... | ... | ... | ... | ... | ... | ... | ... |

TBL102

FIG.9

| USER ID | SECOND GAME POINT | SECOND GAME ITEM |
|---------|-------------------|------------------|
| U1 | 0 | |
| U2 | 70 | SI2, ··· |
| U3 | 115 | SI2, ··· |
| U4 | 30 | SI1, ··· |
| ··· | ··· | ··· |

TBL103

FIG.10

| SECOND PLAYER CHARACTER ID | OWNER | FIRST PLAYER CHARACTER ID | NAME | POSITION | OVERALL CAPACITY | ... | BASIC ABILITY PARAMETER | | SPECIAL ABILITY PARAMETER | | |
|---|---|---|---|---|---|---|---|---|---|---|---|
| | | | | | | | TRAJECTORY | ... | CHANCE ○ | CHANCE ◎ | ... |
| SC1 | U2 | | YAMAMOTO | CATCHER | D | ... | 1 | ... | 0 | 0 | ... |
| SC2 | U2 | FC1 | TANAKA | 1B | C | ... | 3 | ... | 0 | 1 | ... |
| SC3 | U2 | FC50 | NAKAMURA | 2B | A | ... | 4 | ... | 0 | 1 | ... |
| ... | ... | ... | ... | ... | ... | ... | ... | ... | ... | ... | ... |
| SC20 | U3 | FC1 | TANAKA | 1B | C | ... | 3 | ... | 0 | 1 | ... |
| ... | ... | ... | ... | ... | ... | ... | ... | ... | ... | ... | ... |

TBL104

FIG.11

| FIRST PLAYER CHARACTER ID | POPULARITY | NICE POINT | NUMBER OF USES | PERFORMANCE | | | | | |
|---|---|---|---|---|---|---|---|---|---|
| | | | | HIT | HOME RUN | RBI | STOLEN BASE | WIN | SAVE | STRIKEOUT |
| FC1 | SUPER STAR | 1200 | 4128 | 3000 | 540 | 841 | 458 | 0 | 0 | 0 |
| FC5 | STAR | 800 | 3873 | 2462 | 485 | 675 | 310 | 0 | 0 | 0 |
| FC11 | REGULAR | 450 | 105 | 35 | 0 | 5 | 0 | 75 | 0 | 564 |
| ... | ... | ... | ... | ... | ... | ... | ... | ... | ... | ... |

TBL105

GAME SYSTEM, GAME CONTROL DEVICE, AND INFORMATION STORAGE MEDIUM

CROSS-REFERENCE TO RELATED APPLICATION

The present disclosure contains subject matter related to that disclosed in Japanese Patent Application JP2015-194067 filed in the Japan Patent Office on Sep. 30, 2015 and International Patent Application PCT/JP2016/067514 filed in the Japan Patent Office on Jun. 13, 2016, the entire contents of which are hereby incorporated by reference.

TECHNICAL FIELD

The present invention relates to a game system, a game control device, and an information storage medium.

BACKGROUND ART

There is known that a Game having a function (e.g., "Gacha") of selecting at least one game object (e.g., game character, game item, or the like) from game objects which are selection candidates, as a game object to be provided to a user, based on predetermined lottery processing, and providing the user with the selected game object (JP2013-169431A).

SUMMARY OF INVENTION

Technical Problem

In the above described games, if a lineup of selection candidate game objects is fixed, users might lose interest in the games. As Such, game providers (game developers or operators) create new game objects one after another and add them to a lineup in an attempt to make changes to the lineup so that users does note lose interest in the games. This puts an enormous load on the game providers.

One or more embodiments of the present invention have been conceived in view of the above, and an object thereof is to provide a game system, a game control device, and an information storage medium capable of reducing the workload of game providers to make changes to a lineup of selection candidate game objects.

Solution to Problem

In order to solve the above described problems, a game system according to an aspect of the present invention includes at least one processor configured to: select, based on predetermined lottery processing, at least one game object from a plurality of selection candidate game objects as a game object to be associated with first user identification information, associate the selected game object with the first user identification information; and set, as one of the plurality of selection candidate game objects, a game object that is associated with second user identification information and created based on a game play of a second user who is identified by the second user identification information.

A game control device according to an aspect of the present invention includes at least one processor configured to: perform control for a game in which at least one game object is selected from a plurality of selection candidate game objects, as a game object to be associated with first user identification information, based on predetermined lottery processing and the selected game object is associated with the first user identification information; and set, as one of the plurality of selection candidate game objects, a game object that is associated with second user identification information and created based on a game play of a second user who is identified by the second user identification information.

BRIEF DESCRIPTION OF DRAWINGS

FIG. 7 is a diagram illustrating an example of a first user table;

FIG. 8 is a diagram illustrating an example of a first player character table;

FIG. 9 is a diagram, illustrating an example of a second user table;

FIG. 10 is a diagram illustrating an example of a second player character table;

FIG. 11 is a diagram illustrating an example of a use result table;

DESCRIPTION OF EMBODIMENTS

An embodiment of the present invention will be described below in detail with reference to the accompanying drawings.

1. Configuration of Game System

Figure 1:
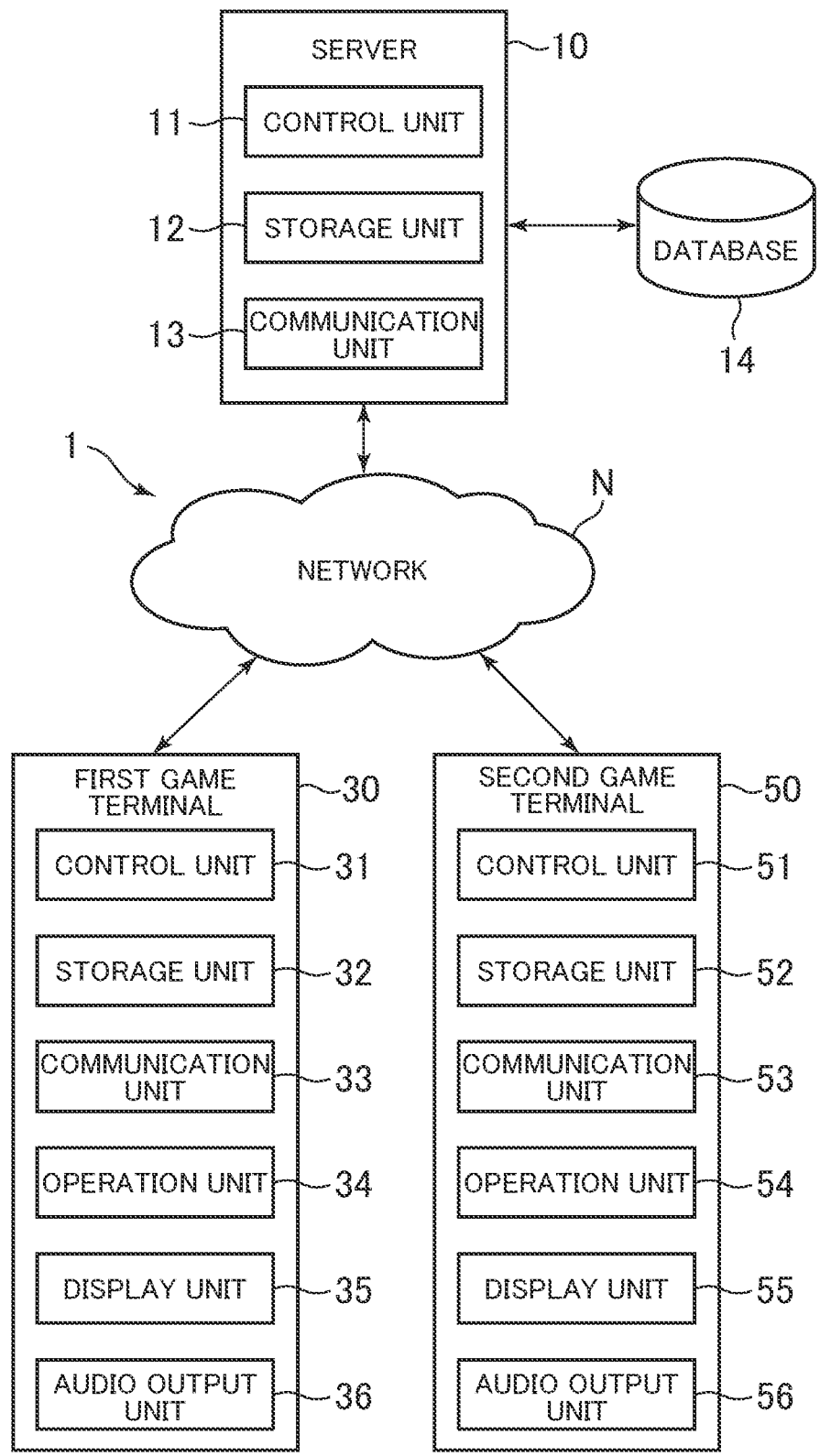
FIG. 1 is a diagram illustrating an overall configuration of a game system according to an embodiment of the present invention.

FIG. 1 is a diagram illustrating a configuration of a game system according to an embodiment of the present invention. As shown in FIG. 1, a game system 1 of this embodiment includes a server 10, a first game terminal 30, and a second game terminal 50. The first game terminal 30 and the second game terminal 50 can perform data communication with each other via a server 10 and a network N.

The server 10 is, for example, a server computer. As shown in FIG. 1, the server 10 includes a control unit. II, a storage unit 12, and a communication unit 13. The control unit 11 includes at least one microprocessor (CPU), and performs information processing in accordance with an operating system or other programs stored in the storage unit 12. The storage unit 12 includes a main memory unit (e.g., RAM) and an auxiliary storage unit (e.g., nonvolatile semiconductor memory, hard disk drive, solid state drive). The storage unit 12 stores programs and data. The communication unit 13 performs data communication with other devices via the network N.

The server 10 can access a database 14. The database 14 may be constructed in the server 10, or in a server computer other than the server 10.

The first game terminal 30 is a computer that is used by a user for playing a game. For example, the first game terminal 30 is a mobile phone (including smartphone), a mobile information terminal (including tablet computer), a desktop computer, a laptop computer, a consumer game machine (stationary game machine), a portable game machine, or an arcade game machine installed in amusement facilities.

As shown in FIG. 1, the first game terminal 30 includes a control unit 31, a storage unit 32, a communication unit 33, an operation unit 34, a display unit 35, and an audio output unit 36. The control unit 31, the storage unit 32, and the communication unit 33 are respectively the same as the control unit 11, the storage unit 12, and the communication unit 13 of the server 10.

The operation unit 34 is used by a user for operations. The operation unit 34 includes a button (key), a lever (stick), a touch panel, a mouse, or the like, for example. The operation unit 34 may be used for operations performed by sound or gesture by the user. The display unit 35 displays various screen images, and is a liquid crystal display, an organic EL display, or the like, for example. The audio output unit 36 outputs sound data, and is speakers, headphones, or the like, for example. The operation unit 34, the display unit 35, and the audio output unit 36 may be included in the first game terminal 30, or provided as external devices connected to the first game terminal 30.

The second game terminal 50 is a computer that is used by the user to play a game. For example, the second game terminal 50 is an arcade game machine installed in amusement facilities, a consumer game machine (stationary game machine), a portable game machine, a desktop computer, a laptop computer, a mobile information terminal (including tablet computer), or a mobile phone (including smartphone). The second game terminal 50 is a different type of game terminal from the first game terminal.

As shown in FIG. 1, the second game terminal 50 includes a control unit 51, a storage unit 52, a communication unit 53, an operation unit 54, a display unit 55, and an audio output unit 56, and these are respectively the same as the control unit 31, the storage unit 32, the communication unit 33, the operation unit 34, the display unit 35, and the audio output unit 36 of the first game terminal 30.

The program and data are provided to the server 10, the first game terminal 30, or the second game terminal 50 from remote locations via the network N, and stored in the storage unit 12, the storage unit 32, or the storage unit 52. The server 10, the first game terminal 30, or the second game terminal 50 may include an element (e.g., optical disc drive, memory card slot) for reading programs and data stored in an information storage medium (e.g., optical disc, memory card). The programs and data may be provided to the server 10, the first game terminal 30, or the second game terminal 50 through the information storage medium.

In the following, as an example of the game system 1, a case will be explained in which the first game terminal 30 is a smartphone (mobile phone) and the second game terminal 50 is an arcade game machine.

2. Overview of Game

A game is executed in the first game terminal 30 or the second game terminal 50 when a program is executed. Variety of games can be played in the first game terminal 30 and the second game terminal 50.

First, a game executed in the first game terminal 30 will be described. For example, a game for generating game objects (e.g., game character, game item, or the like) based on a game play of a user is executed in the first game terminal 30. For example, a game in which a game character is trained by a user is executed in the first game terminal 30.

Here, as an example of a game executed in the first game terminal 30, a baseball-themed game will be described. In particular, a baseball game will be described in which a user trains a game character (referred to as "player character" below) representing a baseball player to create his/her own original player character. In the following, for convenience, such a baseball, game will be described as "first baseball game."

In the first baseball game, a story of a game proceeds as the user repeatedly selects actions (e.g., training, rest, play, or the like) to be performed by a player character that is trained. For example, the first baseball game provides a game story of a player character from the summer of the second grade at senior high school to become a professional baseball player. In this game story, while belonging to a high school baseball team, the player character trains with teammates and participates baseball games (e.g., regional tournaments, national tournaments, and the like) aiming at being scouted by a professional baseball team in the fall of the third grade at senior high school.

For example, in the first baseball game, an experience point is given to the player character based on an action selected by the user. Using the experience point, the user can improve the ability of the player character. For example, basic ability of the player character can be raised, or the player character can learn a special ability. In the first baseball game, a player character of a pitcher or a fielder can be created. Examples of player characters created by the user will be described later (see FIG. 4).

Next, a game executed in the second game terminal 50 will be described. For example, in the second game terminal 50, a game in which a user uses a game object is executed. For example, a game in which users perform a match using game characters is executed in the second game terminal 50.

Here, as an example of a game executed in the second game terminal 50, a baseball-themed game will be described. Specifically, a game, will be described in which a user uses player characters to organize his/her own baseball team, and plays a baseball match with an opponent team (computer or other user). In the following, for convenience, such a baseball game will be referred to as "second baseball game."

For example, in the second baseball game, the user can draw player characters by using game items or game points. The game items and the game points for drawing a lottery are given to the user as a reward for accessing the game system 1 or playing a game. The user may purchase a game item or a game point.

When the user draws a player character, the player character selected from the selection candidate player characters based on the lottery processing is given to the user. In the following, for convenience, a list of the selection candidate player characters, that is, a list of the player characters that can be provided to a user by drawing in the second baseball game is described as "lottery candidate list."

In the second baseball game, the user collects player characters given as described above, and uses the collected player characters to organize his/her own baseball team. The user then uses his/her baseball team to play a baseball match with an opponent team.

In the match with the opponent, the user operates the player characters of hitters or runners when playing offense, and operates the player characters of a pitcher and fielders when playing defense. However, the manner of the game is not limited to this. For example, the user may give general instructions to the player characters while overseeing the game as a manager. Alternatively, the computer may automatically determine a game result based on setting of the team predetermined by the user (e.g., starting order, backup player plan, strategy) and capability parameters of respective player characters.

In the second baseball game described above, if the lineup in the lottery candidate list is fixed, the user might get bored. In this regard, the game system 1 has functions to vary the lineup in the lottery candidate list while preventing increase in the workload of the game provider.

Figure 2:
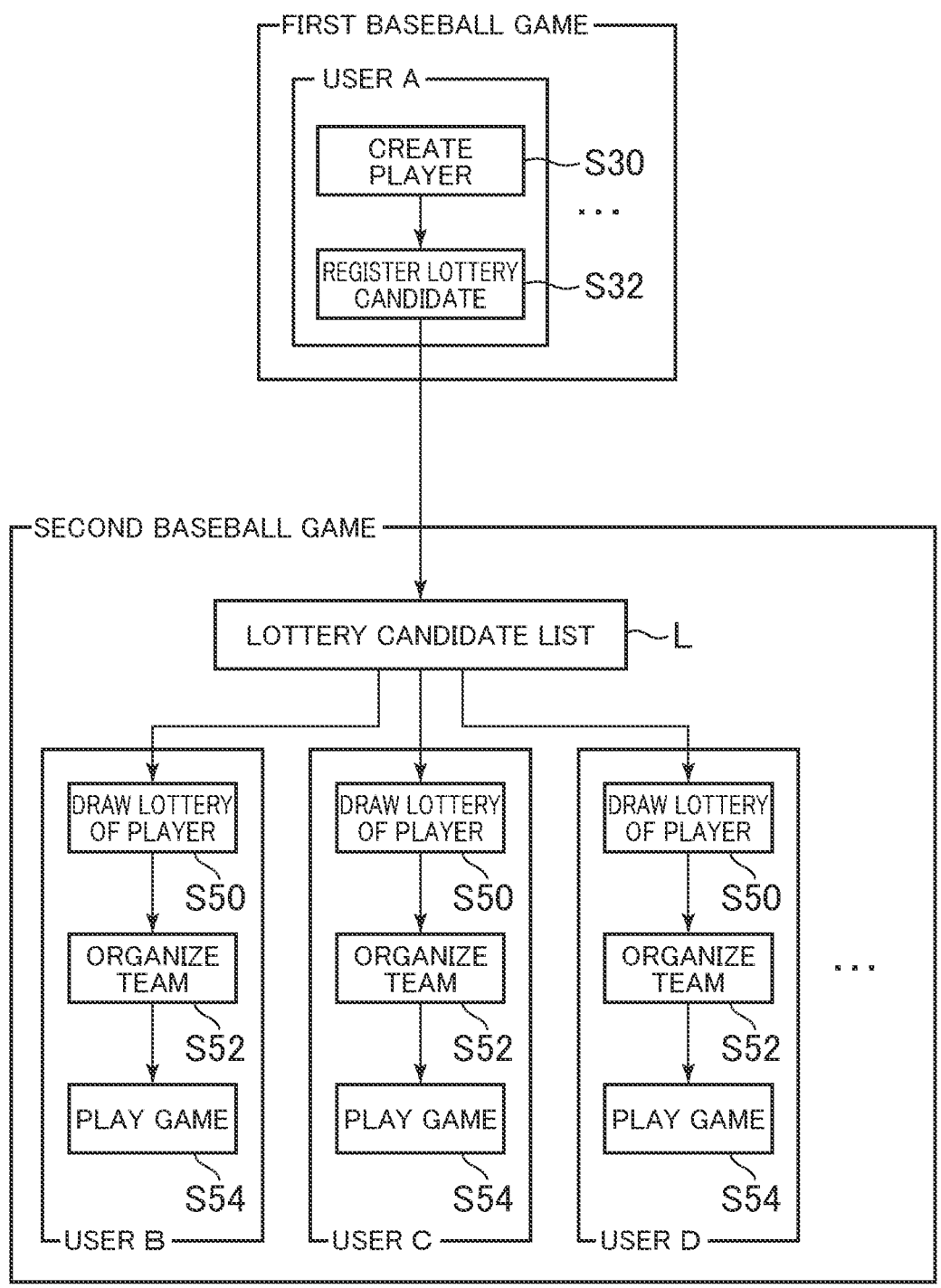
FIG. 2 is a diagram for explaining features of the game system.

FIG. 2 is a diagram for explaining the functions of the game system 1, and the procedure of a user who plays the first baseball game or the second baseball game.

First, the procedure executed by the user (e.g., user A) who plays the first baseball game will be described. As shown in FIG. 2, the user A creates original player characters (S30). Subsequently, the user A registers the created player characters in a lottery candidate list L of the second baseball game (S32). The player character registered in the lottery candidate list L of the second baseball game can be given to other users in the second baseball game.

Figure 3:
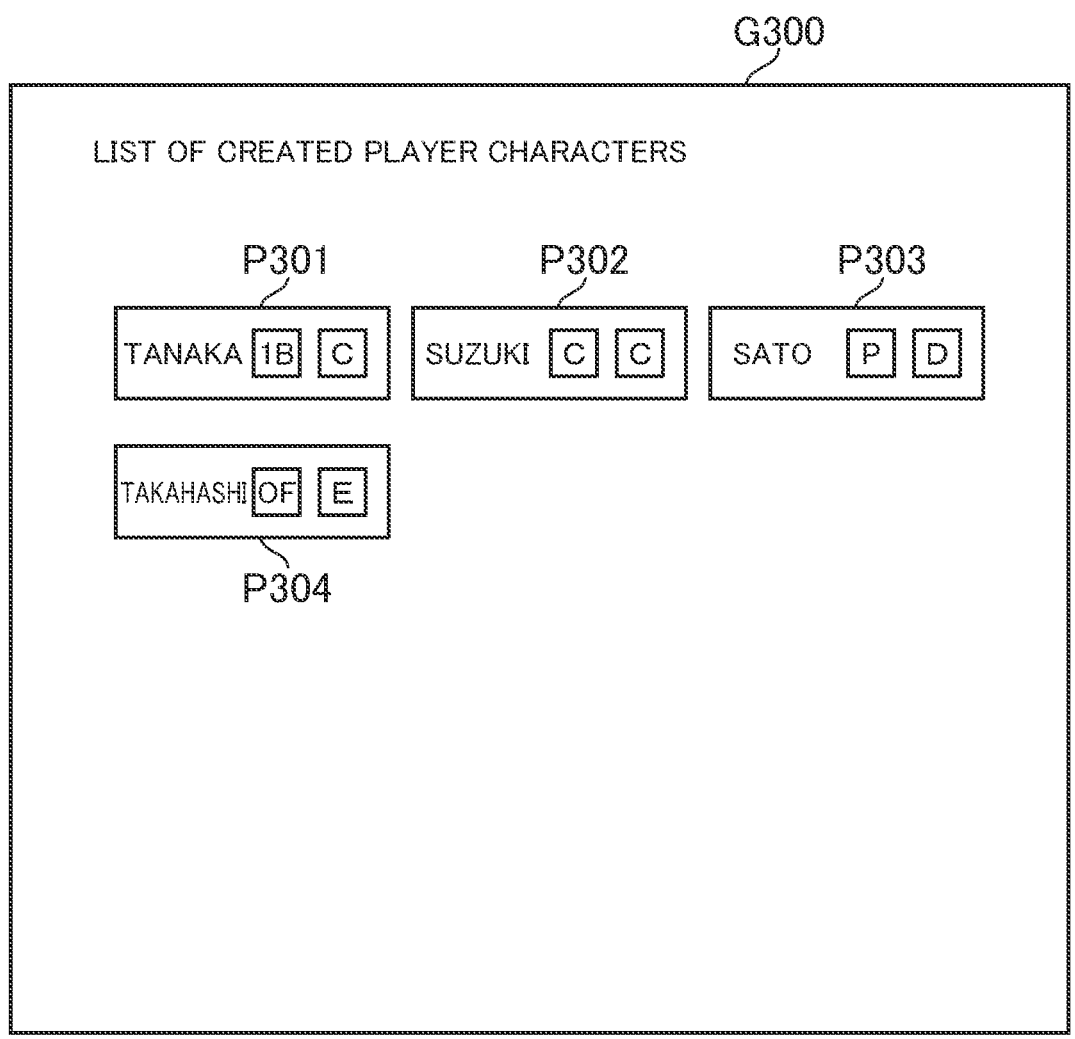
FIG. 3 is a diagram illustrating an example of a selection screen image.
Figure 4:
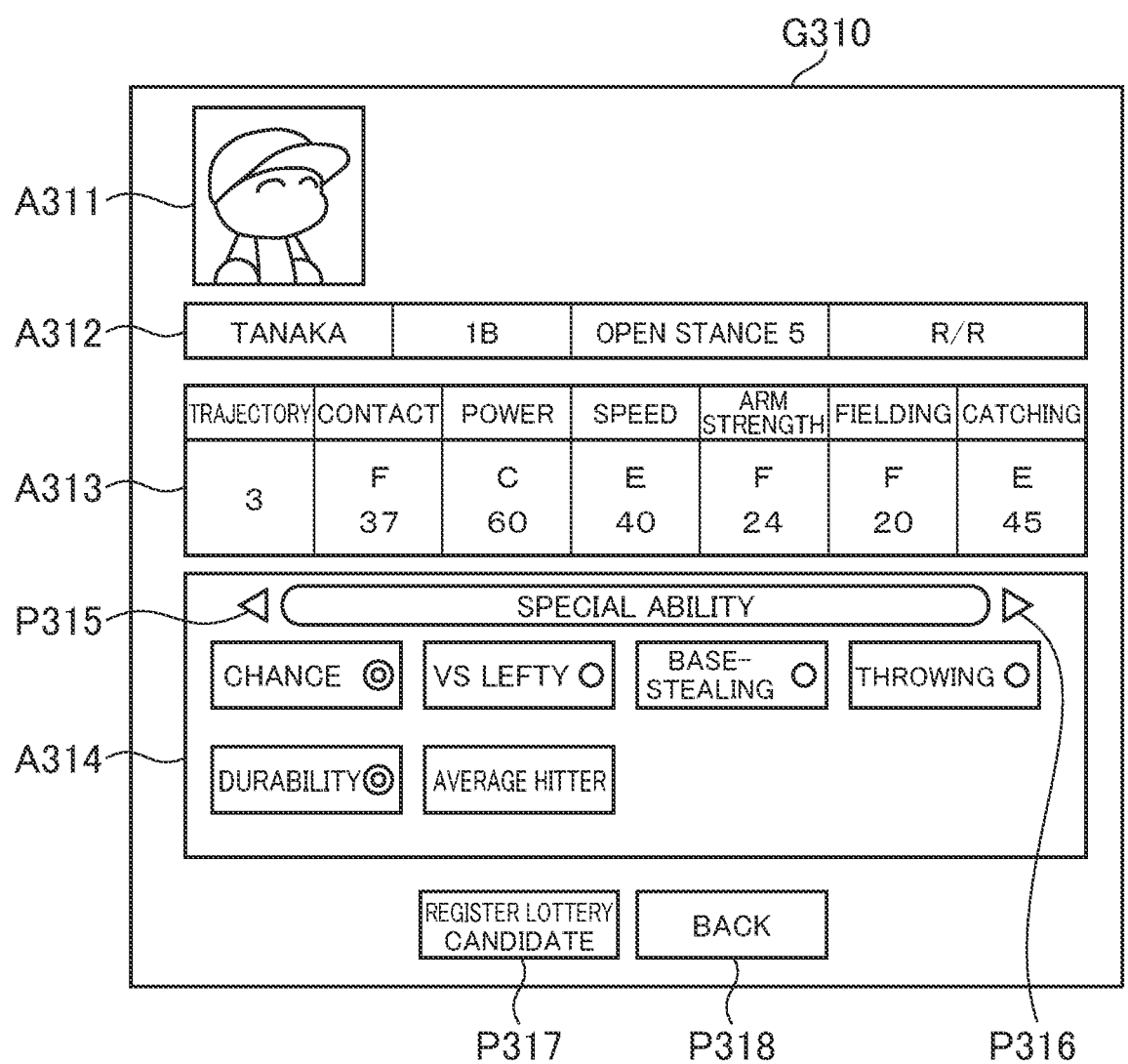
FIG. 4 is a diagram illustrating an example of a register screen image.

FIGS. 3 and 4 illustrate examples of screen images for registration in the lottery candidate list L. These screen images are displayed on the display unit 35 of the first game terminal 30.

FIG. 3 is a diagram illustrating an example of a selection screen image for selecting player characters to be registered in the lottery candidate list L from the player characters created by the user A. As shown in FIG. 3, a selection screen image G300 displays a list of the player characters created by the user A.

Processing objects P301, P302, P303, and P304 are displayed in the selection screen image G300 shown in FIG. 3. The processing object is, for example, an image, a symbol, or a text associated with processing.

The processing objects P301, P302, P303, and P304 respectively correspond to the player characters created by the user A. A name, a position, and overall capacity of a player character are displayed on each of the processing objects P301, P302, P303, P304. The overall capacity is represented by one of alphabets S, A, B, C, D, E, F, and G. "S" represents very high overall capacity, and "G" represents very low overall capacity.

For example, the processing object P301 is associated with the processing for selecting a player character (Tanaka) as a player character to be registered in the lottery candidate list L. As such, when the user selects the processing object P301, a register screen image for registering the player character (Tanaka) in the lottery candidate list L is displayed. The same is applied to other processing objects P302 to P304.

FIG. 4 is a diagram illustrating an example of the register screen image. FIG. 4 shows an example of a register screen image G310 that is displayed when the user A selects the processing object P301. Information about the player character selected in the selection screen image G300 is displayed in the register screen image G310.

For example, an image of the player character is displayed in an area A311 of the register screen image G310. Further, a name, a position, a batting form, and left-handed or right-handed for pitching and batting are displayed in an area A312.

Basic ability parameters of the player character are displayed in an area A313. In the example shown in FIG. 4, a trajectory parameter, a contact parameter, a power parameter, a speed parameter, an arm strength parameter, a fielding parameter, and a catching parameter are displayed in the area A313. In the example shown in FIG. 4, numerical values and alphabets are displayed in the area A313. Here, the numerical values indicate values of the basic ability parameters, and the alphabets indicate levels (scales) of the basic ability. For example, "S, A, B, C, D, E, F, G" are displayed in the area A313. "S" indicates very high ability, and "G" indicates very low ability.

The trajectory parameter indicates how high a ball hit by the player character reaches. The contact parameter indicates contact ability (ability to hit a ball thrown by a pitcher with a bat) of the player character. The power parameter indicates power (ability to hit a ball thrown by a pitcher farther) of the player character. The speed parameter indicates running speed of the player character. The arm strength parameter indicates throwing speed of the player character. The fielding parameter indicates ability of fielding of the player character.

Special, ability acquired by the player character is displayed in an area A314. In the example in FIG. 4, "chance/double circle", "against lefty/single circle", "base-stealing/single circle", "throwing/single circle", "durability/double circle", and "average hitter" are displayed in the area A314 as the special ability acquired by the player character. Here, "double circle" and "single circle" indicate levels of the special ability, and "double circle" indicates the higher level than "single circle" in the special ability.

"Chance/double circle" is special ability of strongly take advantage of a scoring chance. If the player character acquires "chance/double circle", the basic ability of the player character is highly increased when a scoring chance arrives. "Against lefty/single circle" is special ability to hit against left-handed pitchers. If the player character acquires "against lefty/single circle", the basic ability of the player character is highly increased when the opponent pitcher is left-handed. "Base-stealing/single circle" is special ability of stealing a base. If the player character acquires "base-stealing/single circle", the player character likely succeeds in stealing bases.

"Throwing/single circle" is special ability to not to make a bad throw. If the player character acquires "throwing/single circle", the player character is less likely to make a bad throw. "Durability/double circle" is special ability to rarely get injured. If the player character acquires "durability/double circle", the player character rarely gets injured. "Average hitter" is special ability to easily get base hits. If the player character acquires "average hitter", the player character easily makes a base hit.

Processing objects P315 and P316 is displayed in the area A314. The processing objects P315 and P316 are associated with processing for changing content displayed on the area A314. When the user selects the processing object P315 or P316, the display content on the area A314 is changed. For example, information about a personality or the like of the player character is displayed on the area A314.

A processing object P318 is displayed in the register screen image G310. The processing object P318 is associated with processing for returning to the selection screen image G300. As such, when the user selects the processing object P318, the selection screen image G300 is again displayed on the display unit 35.

A processing object P317 is also displayed in the register screen image G310. The processing object P317 is associated with processing for registering player characters in the lottery candidate list L of the second baseball game. As such, when the user selects the processing object P317, the player character displayed on the register screen image G310 is registered in the lottery candidate list L of the second baseball game. In this case, the player character can be given to other user by lottery in the second baseball game.

Next, the processing executed by a user who plays the second baseball game (e.g., user B) will be described.

As shown in FIG. 2, the user B uses the game item or the game point to draw a lottery of player characters, thereby acquiring player characters (S50). In this case, at least one player character is selected from the player characters registered in the lottery candidate list L based on the lottery processing, and the selected player character is given to the user B. The user B obtains the player character in this way, thereby increasing his/her player characters.

A player character registered in the lottery candidate list L can be given to some users. That is, one player character registered by the user A can be given to a plurality of users (e.g., users B, C, D).

Figure 5:
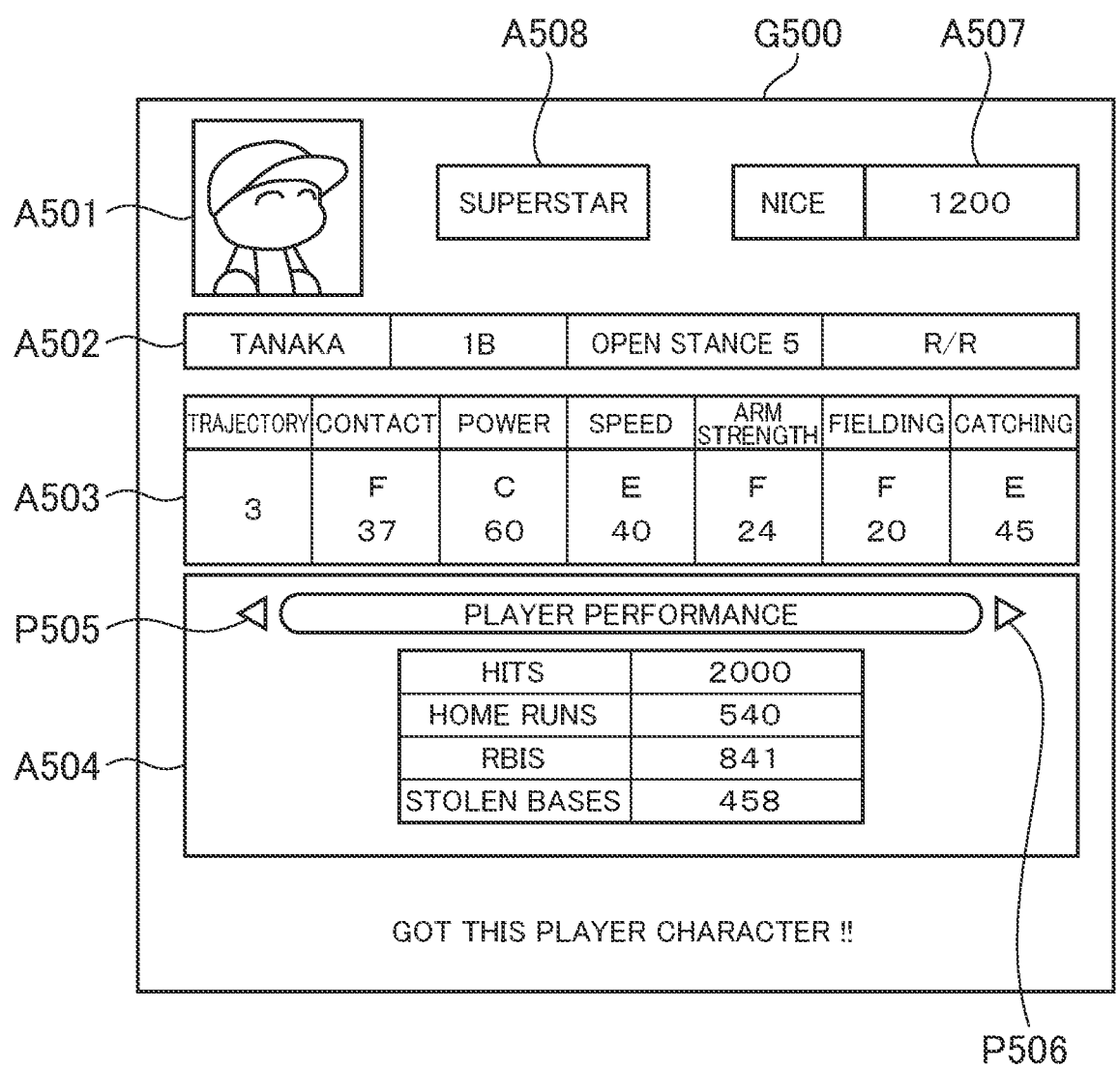
FIG. 5 is a diagram illustrating an example of a lottery result screen image.

FIG. 5 illustrates an example of a lottery result screen image that is displayed when the lottery of player characters is performed. As shown in FIG. 5, information about a player character given to the user as a result of the lottery (in other words, a player character acquired by the user by lottery) is displayed in the lottery result screen image G500. Areas A501, A502, and A503 of the lottery result screen image G500 shown in FIG. 5 are respectively the same as the areas A311, A312, and A313 of the register screen image G310 shown in FIG. 4.

Performance of the player character is displayed on the area A504 of the lottery result screen image G500. As described above, since one player character can be given to some users, at the time when a player character A is given to the user B, there is a possibility that the player character is already given to other user. In this case, the total results of performance of such a player character when the player character plays matches as a member of other user's baseball teams is displayed on the area A504. In the example shown in FIG. 5, total numbers of hits, home runs, RBIs (runs batted in), and stolen bases, respectively, are displayed on the area A504. For example, in a case where the player character A is already given to users C and D at the time when the player character A is given to the user B, the total number of hits made by the player character A while the player character A participates games as a member of the user C's baseball team is "Hc", and the total number of hits made by the player character A while the player character A participates games as a member of the user D's baseball team is "Hd", Hc+Hd is displayed on the area A504 as the number of hits.

Although FIG. 5 shows an example of the lottery result screen image G500 in a case where the player character given to the user is a fielder, if the player character given to the user is a pitcher, the total numbers of wins, saves, and strikeouts are displayed on the area A504, for example.

As shown in FIG. 5, processing objects P505 and P506 are displayed on the area A504. The processing objects P505 and P506 are associated with processing for changing content displayed on the area A504. As such, when the user selects the processing object P505 or P506, the display content of the area A504 is changed. For example, the area A504 displays information about the special abilities of the player character (e.g., display content of the area A314 in FIG. 4), information about the personality of the player character, or the like.

Nice points of the player character is displayed on an area A507. The nice point indicates evaluation of the player character by users who use the player character. When the nice points are higher, the evaluation by the users who use the player character is higher. The details of the nice point will be described later.

A popularity parameter of the player character is displayed on an area A508. The popularity parameter indicates a level of the popularity of the player character. For example, "regular", "star", or "superstar" is set as the popularity parameter of the player character. "Regular" indicates that the popularity is not high, "superstar" indicates the popularity is very high. Initially, the popularity parameter of the player character is set to "regular."

The popularity parameter relates to the nice points. Specifically, when the nice points reach a predetermined value, popularity parameter is raised for one level. For example, when the nice points reach a first predetermined value while the popularity parameter of the player character is "regular", the popularity parameter of the player character is changed to "star". Further, when the nice points reach a second predetermined value (a value greater than the first predetermined value) while the popularity parameter of the player character is "star", the popularity parameter of the player character is changed to "superstar." In this way, as the evaluation by users who use the player character becomes higher, the popularity of the player character becomes higher.

By referring to the areas A504, A507, and A508, the user can understand, the evaluation and the popularity of the player character given by the lottery among other users who use the player character, and how the player character has performed when the player character is used by other users.

As described above, the user acquires player characters. As shown in FIG. 2, the user uses his/her player characters to organize a baseball team (S52), and plays a baseball match with an opponent using the organized baseball team (S54).

Figure 6:
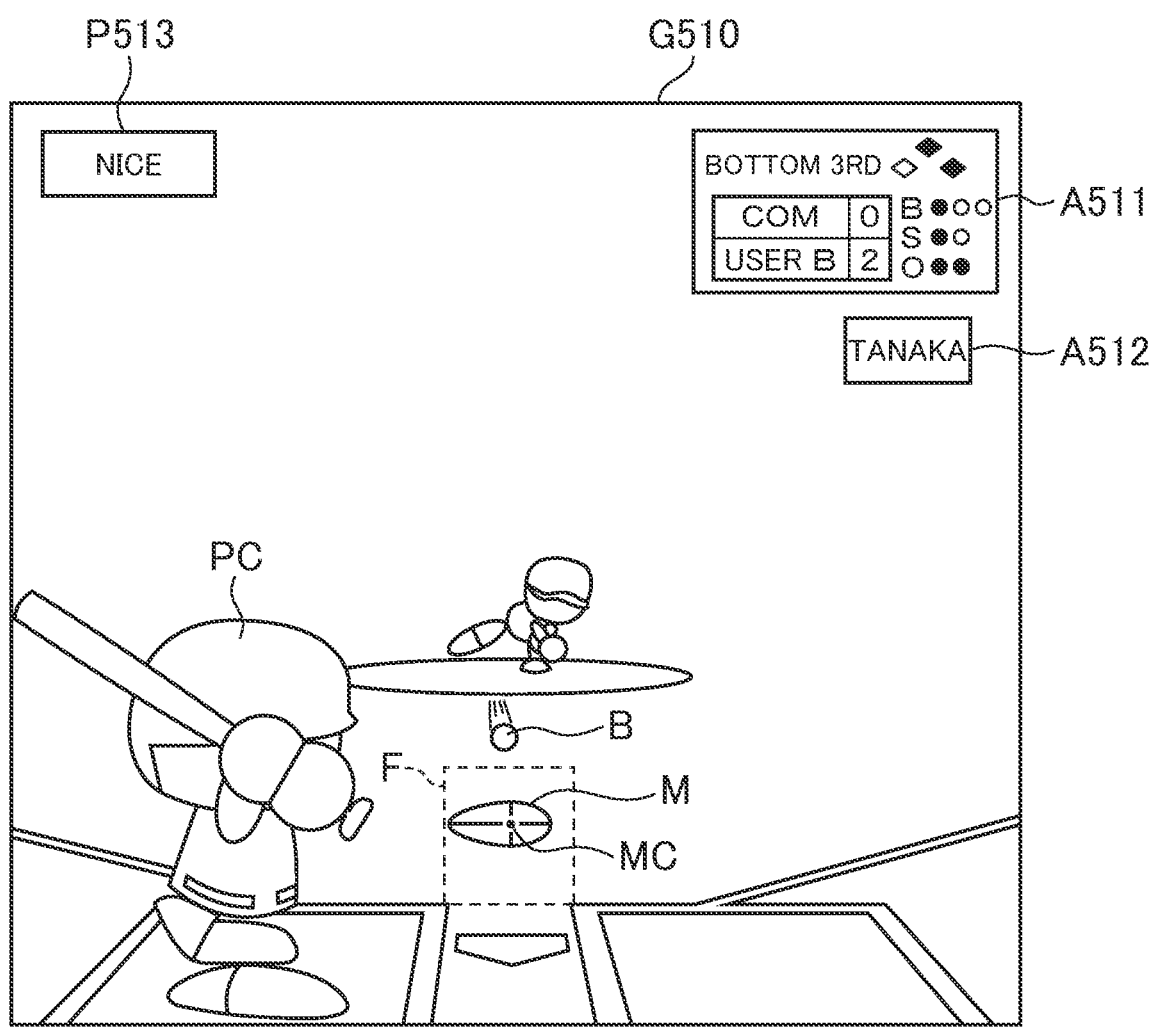
FIG. 6 is a diagram illustrating an example of a match screen image.

FIG. 6 shows an example of a match screen image displayed during a game. A match screen image G510 shown in FIG. 6 shows that the user is on the offense side. That is, the image shows a scene in which the user operates a player character PC, which is a hitter. A current game status is displayed on the area A511, and a name of the player character PC operated by the user is displayed on the area A512.

A frame F and a meet cursor M as operation images for the user to make the player character PC hit a ball are displayed on the match screen image G510. The frame F is displayed above a home plate to indicate a strike zone. The meet cursor M moves along with the user's operation, and indicates a hitting location. When the user performs swing instruction operation, the player character PC swings a bat at the hitting location indicated by the meet cursor M.

When the user performs the swing instruction operation at the time when a ball B passes a plane including the frame F or at nearby timing, the player character PC hits the ball B according to the positional relationship between the meet cursor M and the ball B. For example, when the meet cursor M overlaps the ball B, the ball B is hit. In this case, if the core MC of the meet cursor M overlaps the ball B, the ball is hit hard. On the other hand, if the meet cursor M does not overlap the ball B, it results in a swing and a miss. When the swing instruction, operation is performed at the time separated from the time when the ball B passes the plane including the frame F, it also results in a swing and a miss.

A processing object P513 is also displayed on the match screen image G510. The processing object P513 is associated with the processing for increasing nice points of the player character PC. For example, when the player character PC performs well, the user selects the processing object P513. In this case, the nice points of the player character PC increase for 1 point. In the following, for convenience, the processing object P513 is referred to as "nice button."

As described above, if the nice button is selected, the nice points of the player character increase for 1 point. As such, the nice points correspond to the number of times the nice button is selected for the player character. Further, as described above, one player character can be given to plural users, and thus the nice points of such a player character is the total of the number of times the nice button is selected for the player character by the plural users. For example, if the player character A is given to the users B, C, and D, and the number of times the user B selects the nice button for the player character A is "Nb", the number of times the user C selects the nice button for the player character A is "Nc", and the number of times the user D selects the nice button for the player character A is "Nd", the value of the nice points of the player character A is Nb+Nc+Nd.

Selecting a nice button corresponds to giving good evaluation to a player character, and thus a player character with many nice points is a player character highly evaluated by the users who use the player character.

As described above, in the game system 1, the player character created by the user of the first baseball game is registered in the lottery candidate list (list of player character candidates that can be given to users of the second baseball game by lottery) of the second baseball game. Consequently, changes in the lineup in the lottery candidate list of the second baseball game can be provided even if the game provider does not create a new player character.

In the game system 1, upon a request from a user, player characters created by such a user are registered in the lottery candidate list of the second baseball game. As such, the user can determine whether to register a player character created by the user in the lottery candidate list.

In order to vary the lineup in the lottery candidate list of the second baseball game as described above, it is necessary that a user of the first baseball game registers a player character created by the user in the lottery candidate list. In this regard, the game system 1 also has functions to motivate the user of the first baseball game to register the player character created by the user in the lottery candidate list of the second baseball game.

In particular, in the game system 1, when the player character A created by the user A in the first baseball game is given to other user in the second baseball game, a reward is given to the user A who has created the player character under predetermined conditions. For example, when the nice points of the player character A reach a predetermined value, a reward is given to the user A. In this case, for example, a game point or a game item that is usable in the first baseball game is given to the user as a reward. Specifically, for example, a game item for assisting the user to create a player character with high ability is given to the user as a reward. Alternatively, an experience point necessary for improving ability of a player character that is being created is given as a reward. In this way, the user of the first baseball game can be motivated to register the player character created by the user in the lottery candidate list of the second baseball game, or to create a player character that can receive many nice points from other users.

The configuration to motivate the user of the first baseball game is not limited to the above example. Other examples will be described below.

Example 1

A reward may be given to the user A when the total number of times other users use the player character A reach the predetermined value. In this way, the user of the first baseball game can be motivated to create a player character that would be used many times by other users.

Example 2

A reward may be given to the user A when the performance of the player character A used by other users satisfies a predetermined condition. For example, when the total number of hits of the player character A reaches the predetermined value, a reward may be given to the user A. Alternatively, when the player character A is ranked at or higher than a predetermined rank in the performance ranking of all the player characters, a reward may be given to the user A. In this way, the user of the first baseball game can be motivated to create a player character that can produce good performance.

Example 3

A reward may be unconditionally given to the user A when the player character A created by the user A in the first baseball game is given to another user in the second baseball game. This can also motivate the user of the first baseball game to register the player character created by the user in the lottery candidate list of the second baseball game.

Example 4

Instead of providing a reward to the user A, the basic ability of the player character A may be improved in the first baseball game, or the player character A may acquire special ability in the first baseball game. This can also motivate the user of the first baseball game to register the player character created by the user in the lottery candidate list of the second baseball game.

While the above describes the functions of motivating the user of the first baseball game to create a player character and register the created player character in the lottery candidate list of the second baseball game, the game system 1 also has a function of motivating the user of the second baseball game to use a player character.

In particular, in the game system 1, a reward is given to the user B when the player character A used by the user B in a match between the user B and an opponent makes a hit and the total number of hits made by the player character A reaches a predetermined value (e.g., 500, 1000, 1500, 2000). In this case, for example, a game point or a game item that is usable in the second baseball game is given to the user as a reward. Specifically, for example, a game point or a game item to be used for drawing a player character is given to the user as a reward. In this way, the user of the second baseball game can be motivated to use a player character and play a game.

In the above described case as well, a reward may be given to the user A who is the creator of the player character A. For example, a game point or a game item that is usable in the first baseball game may be given to the user A as a reward.

3. Data Configuration

In the following, an example of data necessary for implementing the above functions will be described. FIGS. 7 to 11 show examples of data for executing the baseball game described above. These data items are stored in the database 14, for example.

FIG. 7 shows an example of a first user table. A first user table TBL101 is data indicating information about users that play the first baseball game. As shown in FIG. 7, the first user table TBL101 includes fields of "user ID", "first game point", and "first game item."

The user ID field indicates information for uniquely identifying users. The first game point field indicates an amount of game points (game points usable in the first baseball game) of each user. The first game item field indicates a list of game items (game items usable in the first baseball game) of each user. In this regard, "game point of each user" and "game item of each user" are a game point and a game item that a user can freely use.

FIG. 8 shows an example of a first player character table. A first player character table TBL102 is data indicating a list of player characters created in the first baseball game. As shown in FIG. 8, the first player character table TBL102 includes fields of "first player character ID", "creator", "name", "position", "overall capacity", "basic ability parameter", "special ability parameter", and "lottery candidate flag."

The first player character ID field indicates information for uniquely identifying player characters created in the first baseball game. The creator field indicates a user ID of a user who is a creator of a player character. The name and position fields indicate a name and a position of a player character. The overall capacity field indicates a level of overall capacity of a player character.

In the basic ability parameter field, a level of a basic ability parameter indicating basic ability of a player character is registered. In the special ability parameter field, a special ability parameter indicating whether a player character acquires special ability is registered.

The lottery candidate flag field indicates whether a player character is registered in the lottery candidate list of the second baseball game. For example, a value "0" or "1" is registered in the lottery candidate registration flag field. The value "0" indicates that the player character is not registered in the lottery candidate list of the second baseball game, and the value "1" indicates that the player character is registered in the lottery candidate list of the second baseball game. In this case, the list of the player character having the value "1" in the lottery candidate flag field corresponds to the lottery candidate list L shown in FIG. 2.

Although omitted in FIG. 8, the first player character table TBL102 also includes a field indicating an image of player character, a field indicating a batting form of a player character, and a field indicating left-handed or right-handed in pitching or hitting, for example.

FIG. 9 shows an example of a second user table. A second user table TBL103 is data indicating information about users that play the second baseball game. As shown in FIG. 9, the second user table TBL103 includes fields of "user ID", "second game point", and "second game item."

The user ID field is the same as the user ID field of the first user table TBL101. Here, the common user ID is used in the first baseball game and the second baseball game, although different user IDs may be used in the first baseball game and the second baseball game.

The second game point field indicates an amount of game points (game points usable in the second baseball game) of each user. The second game item field indicates a list of game items (game items usable in the second baseball game) of each user.

FIG. 10 Shows an example of a second player character table. A second player character table TBL104 shows a list of player characters owned by users that play the second game. As shown in FIG. 10, the second player character table TBL104 includes fields of "second player character ID", "owner", "first player character ID", "name", "position", "overall capacity", "basic ability parameter", and "special ability parameter."

The second player character ID field indicates information for uniquely identifying player characters owned by users that play the second game. If one player character is given to plural users, the player characters given to the plural users share the same first player character ID and have different second player character IDs.

The owner field indicates a user ID of a user who owns a player character. The first player character ID field indicates a first player character ID of a player character. When a player character is created by a user of the first baseball game, a first player character ID of the player character is registered in the first player character ID field. In the second baseball game, there is also a case where a player character created by the game provider is given to a user. In this case, a first player character ID field of such a player character is blank.

The fields of "name", "position", "overall capacity", "basic ability parameter", and "special ability parameter" are respectively the same as the fields of "name", "position", "overall capacity", "basic ability parameter", and "special ability parameter" of the first player character table TBL102.

FIG. 11 shows an example of a use result table. The use result table TBL105 is data indicating results of use of player characters, which are created by the users of the first baseball game, in the second baseball game.

As shown in FIG. 11, the use result table TBL105 includes fields of "first player character ID", "popularity", "nice point", "number of uses", and "performance."

A first player character ID of a player character is registered in the first player character ID field. The results of use of the player characters in the second baseball game are managed for respective first player character IDs. The popularity field includes a popularity parameter of a player character. The nice point field includes nice points of a player character.

The number of uses field indicates the number of times a player character is used. A player character may be determined as being used when the player character is registered as a member of a baseball team and a baseball match is executed, or when the player character is actually participated in the baseball match. Further, as described above, in the case where one player character is given to plural users, the total number of times such a player character is used by the plural users is registered in the number of uses field.

The performance field indicates performance of a player character. As described above, in the case where one player character is given to plural users, the performance field includes the total of the performance of such a player (e.g., hits, home runs, RBIs, stolen bases, wins, saves, strikeouts) achieved when such a player character participates in games of baseball teams of the plural users.

4. Functional Block

Figure 12:
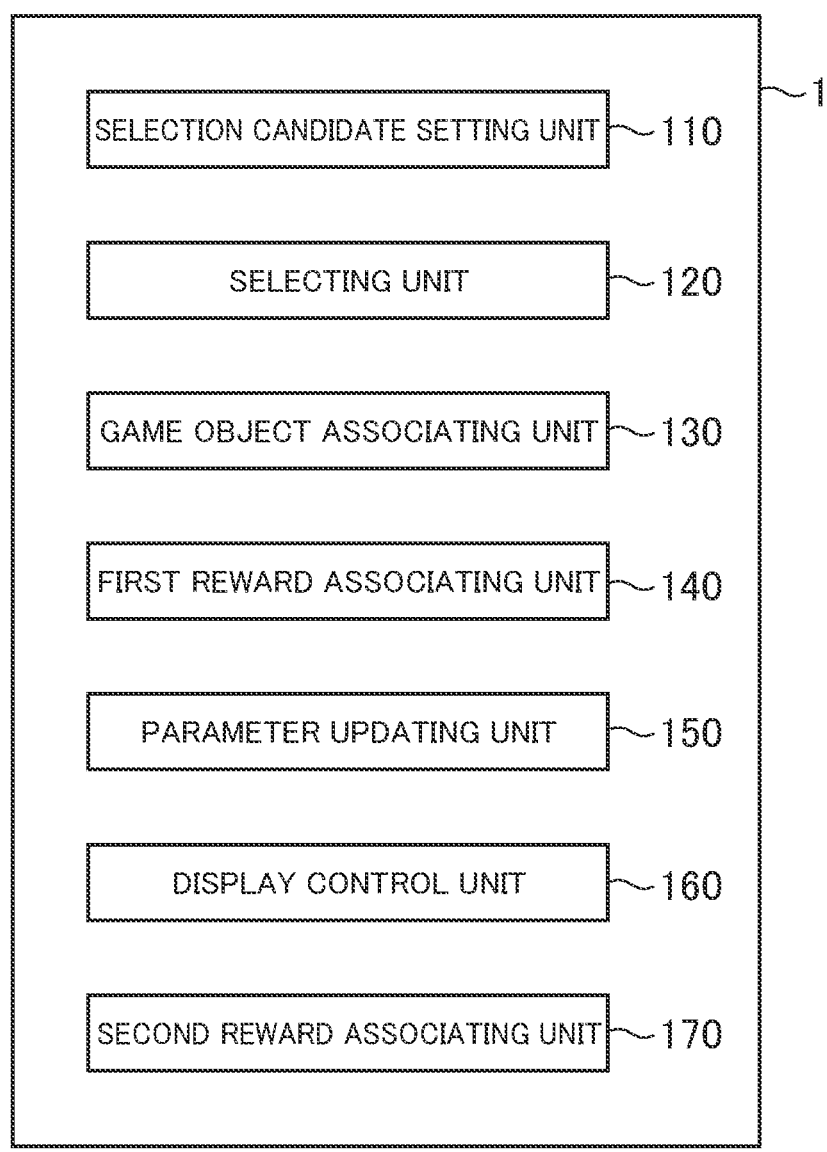
FIG. 12 is a functional block diagram of the game system according to an embodiment of the present invention.

Next, a functional block, implemented in the game system 1 will be described. FIG. 12 shows an example of the functional block implemented in the game system 1. As shown in FIG. 12, the game system 1 includes a selection candidate setting unit 110, a selecting unit 120, a game object associating unit 130, a first reward associating unit 140, a parameter updating unit 150, a display control unit 160, and a second reward associating unit 170. These functions are implemented by, for example, the control unit 11 of the server 10 (game control device).

First, the selection candidate setting unit 110, the selecting unit 120, and the game object associating unit 130 will be described. The selecting unit 120 and the game object associating unit 130 will be described first, then the selection candidate setting unit 110 will be described.

The selecting unit 120 selects at least one game object from a plurality of selection candidate game objects (a plurality of game objects which are selection candidates), as a game object to be associated with the first user identification information, based on the predetermined lottery processing. The game object associating unit 130 then associates the game object selected by the selecting unit 120 with the first user identification information.

Here, the "game object" can be used in games. For example, a game character, a game item, or the like corresponds to an example of the "game object". The game character or the game item may be displayed on a game screen in a format of a game card. For example, plural parameters are set to a game object.

The "parameter" set to a game object is, for example, information about capability of the game object. In other words, the "parameter" is, for example, information indicating levels of capability of a game object, or information indicating whether a game object has specific capability.

Further, the "parameter" may be information indicating, for example, a status of a game object. That is, the "parameter" may be information indicating, for example, how good or bad a status of a game object is. Alternatively, the "parameter" may be information indicating, for example, rarity or popularity of a game object.

For example, when a game object is a player character of a baseball game, examples of the "information indicating capability of a game object" include information about levels of abilities of pitching, hitting, defense, base-running, and the like, or information indicating whether the player character has special ability, and examples of the "information indicating a status of a game object" include information about levels of stamina (or degree of fatigue), or information indicating how good or bad condition is.

For example, when a game object is a player character of a soccer game, examples of "information indicating capability of a game object" include information about levels of abilities of passing, dribbling, shooting, defense, running, and the like, or information indicating whether the player character has special ability, and examples of "information indicating a status of a game object" include information about levels of stamina (or degree of fatigue), or information indicating how good or bad condition is.

For example, when a game object is a game character that battles against an enemy, examples of "information indicating capability of a game object" include information about levels of abilities of offense, defense, and the like, or information indicating whether the game character has special ability, and examples of "information indicating a status of a game object" include hit points.

For example, when a game object is a game item, examples of "information indicating capability of a game object" include information about levels of effectiveness of game items, and examples of "information indicating a status of a game object" include information about the remaining number of times the game item can be used or the number of times the game item is used.

The parameter is not limited to numerical information, but may be information other than numerical information.

The "user identification information" is information for uniquely identifying users. In other words, the "user identification information" is information for specifying users. For example, examples of "user identification information" include a user ID, a user's name, a user account, or an e-mail address. The first user identification information is user identification information for identifying the first user.

"To associate a game object with user identification information" is to store a game object in association with user identification information. In other words, "to associate a game object with user identification information" is to provide a game object to a user identified by the user identification information. In still other words, "to associate a game object with user identification information" is to add a game object to game objects owned by the user identified by the user identification information. Here, "game objects owned by the user" are game objects that the user can freely use.

"The game object to be associated with the user identification information" is a game object stored in association with the user identification information. In other words, "the game object to be associated with the user identification information" is a game object provided to a user identified by the user identification information. In still other words, "the game object to be associated with the user identification information" is a game object to be added to game objects owned by the user identified by the user identification information.

The "selection candidate" is a candidate which may be selected as a game object to be associated with the user identification information. In other words, the selection candidate is a game object that can be selected as a game object to be associated with the user identification information.

The "lottery processing" is processing for automatically selecting at least one game object from a plurality of selection candidate game objects, as a game object to be associated with the user identification information, based on predetermined probability. In other words, the "lottery processing" is processing for automatically selecting at least one game object from a plurality of selection candidate game objects, as a game object to be associated with the user identification information, based on random numbers (or at random).

The selection candidate setting unit 110 sets a game object, which is associated with second user identification information and created based on the game play of the second user identified by the second user identification information, as one of the selection candidate game objects.

Here, the "second user identification information" is user identification information other than the first user identification information, and user identification information for identifying a second user who is a user other than the first user.

The "game object created based on the game play of the user" is a game object that is created as a result of the user's game play. In other words, the "game object created based on the game play of the user" is a game object to which parameters are set based on the user's game play. For example, the "game object created based on the game play of the user" is a game object in which a parameter is updated from the initial state and established based on the user's game play. In other words, the "game object created based on the game play of the user" is a game object, created by a user. That is, in other words, the "game object created based on the game play of the user" is a game character trained by the user or a game item upgraded by the user, for example.

The "selection candidate game objects" may include only a game object created based on the user's game play, or include both of a game object created by the user's game play and other game object (e.g., game object created by a game provider).

For example, upon receiving a predetermined setting request from the second user, the selection candidate setting unit 110 sets the game object associated with the second user identification information as one of the selection candidate game objects.

Here, the "setting request" is a request for setting a game object as a selection candidate game object. Further, "receiving a setting request from a user" is to receive, from the user's terminal, data indicating that the user requests to set a game object as a selection candidate game object. Alternatively, "receiving a setting request from a user" may be to receive an operation indicating that the user requests to set a game object as a selection candidate game object.

In a case where the game object associated with the second user identification information is selected by the selecting unit 120, the game object associating unit 130 associates the game object, which is associated with the second user identification information, with the first user identification information.

"To associate the game object, which is associated with the second user identification information, with the first user identification information" is to associate a copy of the game object, which is associated with the second user identification information, with the first user identification information. Alternatively, "to associate the game object, which is associated with the second user identification information, with the first user identification information" may also be to associate am original of the game object, which is associated with the second user identification information, with the first user identification information.

The game object associated with the second user identification information may be sometimes associated with each of plural pieces of user identification information other than the second user identification information. When a game object associated with the second user identification information is selected by the selecting unit 120 and associated with first user identification information, the game object is made available for use in a game played by the first user.

For example, "game object associated with the second user identification information" is a game object that is created based on the second user's play of the first game, and when the game object is selected by the selecting unit 120 and associated with the first user identification information, the game object is made available for use in the second game (game different from the first game) played by the first user.

Here, "game different from the first game" is, for example, a game provided separately from the first game. For example, the "game different from the first game" is a game executed based on a second game program, which is different from a first game program for executing the first game. For example, the "game different from the first game" is a game provided in a game terminal of other type than the game terminal in which the first game is provided. For example, in a case where the first game, is a game provided by a mobile phone (smartphone), the second game is a game provided by game terminals (e.g., arcade game machine, consumer game machine (stationary game machine), portable game machine, desktop computer) other than the mobile phone (smartphone).

In the first and second baseball games described above, when the processing object P317 of the register screen image G310 is selected, data indicative of requesting to register the player character in the lottery candidate list is sent to the server 10. In this case, an example of "setting request" corresponds to requesting to register the player character in the lottery candidate list. Further, to update the lottery candidate flag of the player character to "1" corresponds to an example of "setting a game object as one of the selection candidate game objects." The player characters having the lottery candidate flag of "1" correspond to an example of "the selection candidate game objects."

As such, in a case where the data indicating that the user A (an example of the second user) requests to register a player character in the lottery candidate list is received from the first game terminal 30 of the user A, the selection candidate setting unit 110 updates the lottery candidate flag of the player character to 1.

The selecting unit 120 selects at least one of the player characters that are registered in the first player character table TBL102 and have a lottery candidate flag "1" as a player character to provide to the user B (an example of first user) based on the predetermined lottery processing.

The game object associating unit 130 then provides the user B with the player character selected by the selecting unit 120. Specifically, the game object associating unit 130 registers information about the player character selected by the selecting unit 120 in the second player character table TBL104 in association with the user ID of the user B.

Next, the first reward associating unit 140 will be described.

In a case where the game object associated with the second user identification information is selected by the selecting unit 120 and associated with the first user identification information, the first reward associating unit 140 associates a reward with the second user identification information.

Here, "to associate a reward with the user identification information" is to give a reward to the user identified by the user identification information.

For example, providing the user with a game object corresponds to an example of "to associate a reward with user identification information." That is, providing a user with a new game object that the user does not have or providing a user with a game object that the user already have in order to increase the number of game objects of the user correspond to examples of "to associate a reward with user identification information." In other words, examples of "to associate a reward with user identification information" include to associate a new game object with the user identification information and, while a game object is associated with user identification information, to further associate the game object with the user identification information so as to increase the number of game objects associated with the user identification information.

For example, providing a user with a game point also corresponds to an example of "to associate a reward with user identification information." That is, increasing the user's game points corresponds to an example of "to associate a reward with user identification information." In other words, examples of "to associate a reward with user identification information" include, while the user identification information is associated with a game point, further associating the game point with the user identification information so as to increase the game points associated with the user identification information.

The "game point" serves as currency in a game, for example. The "game point" is, for example, a point to be used for obtaining a new game object (e.g., game item). In this regard, the "game point" is not limited to be used in a game as currency. For example, the "game point" may be a point to improve capability of a game object (e.g., experience point). That is, the "game point" may be a point to be used to improve the capability of the game object.

The "reward" is not limited to a game object or a game point, but various rewards may be set in accordance with content of games. The "reward" may be to temporarily or permanently change a parameter (parameter other than a game point) associated with the user so as to be advantageous to the user.

"To associate a reward with the second user identification information in a case where the game object associated with the second user identification information is associated with the first user identification information" is, for example, to associate a reward with the second user identification information based on a predetermined condition in the case where the game object associated with the second user identification information is associated with the first user identification information.

Here, the "predetermined condition" is a condition that needs to be satisfied so as to associate a reward with the first user identification information. In other words, the "predetermined condition" is a condition as a reference for determining whether to associate a reward with the first user identification information. For example, when the predetermined condition is satisfied, a reward is associated with the first user identification information, and when the predetermined condition is not satisfied, a reward is not associated with the first user identification information.

"To associate a reward with the second user identification information in a case where the game object associated with the second user identification information is associated with the first user identification information" may be, for example, to unconditionally associate a reward with the second user identification information in the case where the game object associated with the second user identification information is associated with the first user identification information.

In the above described first and second baseball games, the first reward associating unit 140 provides the user A with a reward based on evaluation of the player character A by the user B in a case where the player character A (an example of the game object associated by the second user identification information) created by the user A in the first baseball game is selected by the selecting unit 120 and given to the user B (an example of the first user).

Here, "evaluation of the player character by the user" indicates that the user evaluates satisfaction level or degree of the player character. In other words, "evaluation of the player character by the user" indicates that the user evaluates how good the player character is.

"To provide the user with a reward based on evaluation of the player character" is to determine whether to provide the user with a reward based on the evaluation of the player character. For example, "to provide the user with a reward based on evaluation of the player character" is to determine whether to provide the user with a reward based on whether the evaluation of the player character satisfies the predetermined condition.

Further, "to provide the user with a reward based on evaluation of the player character" may be to determine a type or an amount of a reward to be provided to the user based on the evaluation of the player character. For example, "to provide the user with a reward based on evaluation of the player character" may be to determine a type or an amount of a reward to be provided to the user based on whether the evaluation of the player character satisfies the predetermined condition. For example, types of rewards to the user may vary between a case where the evaluation of the player character satisfies the predetermined condition and a case where the evaluation of the player character does not satisfy the predetermined condition. For example, when the evaluation of the player character satisfies the predetermined condition, a greater amount of rewards may be provided to the user compared to a case where the evaluation of the player character does not satisfy the predetermined condition.

In the above described first and second baseball games, the nice point of the player character corresponds to an example of the "evaluation of the player character". When the nice point of the player character is greater than or equal to a predetermined value, the first reward associating unit 140 provides a reward to the user A who is a creator of the player character A.

The first reward associating unit 140 may provide the user A with a reward based on the result of use of the player character A in the second baseball game played by the user B in a case where the player character A which is created by the user A in the first baseball game (an example of the game object associated with the second user identification information) is selected by the selecting unit 120 and given to the user B (an example of the first user).

Here, "use of the player character" indicates that, for example, the user operates the player character as an operation target, or the user gives instructions to the player character as an instruction target. Further, "use of the player character" is, for example, to make the player character appear in the game. In other words, "use of the player character" is to display the player character on the game screen. In the above described first and second baseball game, an example of "use of the player character" corresponds to setting the player character as a member of a baseball team, or making the player character participate in a baseball match. In the case of a game item, "use of the game item" is, for example, to enable the game item to produce its effect.

"Result of use" indicates, for example, whether the player character is used. Further, "result of use" may be, for example, the number of times the player character is used, or the length of time the player character is used. Alternatively, "result of use" may be, for example, whether or how the player character used in a baseball match contributes to the baseball match.

For example, the performance of the player character in the baseball match corresponds to an example of "whether or how the player character contributes." For example, in a case of the player character of a baseball game, examples of "performance" include the number of hits, home runs, RBIs, stolen bases, wins, saves, strikeouts, or the like, for example. In a case of the player character of a soccer game, examples of "performance" include the number of scores, assists, lost points, or the like, for example. In a case of the game character that battles against enemies, examples of "performance" include the number of defeated enemies, damages to the enemies, whether a specific enemy (e.g., boss), or the like is beaten, for example.

An example of "whether or how the player character contributes" also corresponds to whether an effect is produced by the player character used in the baseball match or a level of the effect. For example, in a case where the player character is incorporated in a team (group or deck) and thereby improving overall capability of the team (group or deck), an example of "whether or how the player character contributes" corresponds to whether there is an improvement or a level of the improvement. Alternatively, for example, in a case where the player character is used to affect other game objects (e.g., to improve capability of teammate player characters or to lower capability of opponent player characters), an example of "whether or how the player character contributes" corresponds to whether there is an effect or a level of the effect.

"To provide the user with a reward based on the result of use of the player character" is to determine whether to provide the user with a reward based on the result of use of the player character. For example, "to provide the user with a reward based on the result of use of the player character" is to determine whether to provide the user with a reward based on whether the result of use of the player character satisfies a predetermined condition.

Further, "to provide the user with a reward based on the result of use of the player character" may be to determine a type or an amount of reward to be provided to the user based on the result of use of the player character. For example, "to provide the user with a reward based on the result of use of the player character" may be to determine a type or an amount of reward to be provided to the user based on whether the result of use of the player character satisfies the predetermined condition. For example, a type of a reward to be provided to the user may vary between a case where the result of use of the player character satisfies the predetermined condition and a case where the result of use of the player character does not satisfy the predetermined condition. Further, for example, greater amount of rewards may be provided to the user in a case where the result of use of the player character satisfies the predetermined condition than in a case where the result of use of the player character does not satisfy the predetermined condition.

In the above described first and second baseball games, the number of times the player character is used (see FIG. 11) corresponds to an example of the "result of use of the player character." As such, the first reward associating unit 140 may provide the user A with a reward when the number of times the player character A is used reaches the predetermined value.

The performance of the player character (see FIG. 11) also corresponds to an example of the "result of use of the player character." As such, the first reward associating unit 140 may provide the user A with a reward when the number of hits (or home runs, RBIs, stolen bases, wins, saves, strikeouts) of the player character A reaches the predetermined value.

Next, the parameter updating unit 150 will be described.

The parameter updating unit 150 updates a parameter of the game object associated with the second user identification information in a case where the game object associated with the second user identification information is selected by the selecting unit 120 and associated with the first user identification information.

In the above described first and second baseball game, for example, the parameter updating unit 150 updates the parameter of the player character A based on the evaluation of the player character A by the user B, in a case where the player character A created by the user A in the first baseball game (an example of the game object associated with the second user identification information) is selected by the selecting unit 120 and provided to the user B (an example of the first user).

Here, "the evaluation of the player character by the user" is the same as that in the first reward associating unit 140.

"To update the parameter of the player character based on the evaluation of the player character" is to determine whether to update the parameter of the player character based on the evaluation of the player character. For example, "to update the parameter of the player character based on the evaluation of the player character" is to determine whether to update the parameter of the player character based on whether the evaluation of the player character satisfies the predetermined condition.

Alternatively, "to update the parameter of the player character based on the evaluation of the player character" may be to determine a degree of updating of the parameter of the player character based on the evaluation of the player character. For example, "to update the parameter of the player character based on the evaluation of the player character" may be to determine the degree of updating of the parameter of the player character based on whether the evaluation of the player character satisfies the predetermined condition. For example, in a case where the evaluation of the player character satisfies the predetermined condition, the degree of updating of the parameter of the player character may be greater than that in a case where the player character does not satisfy the predetermined condition.

In the above described first and second baseball games, the nice point of the player character corresponds to an example of "evaluation of the player character", and the popularity parameter of the player character corresponds to an example of "parameter." The parameter updating unit 150 updates the popularity parameter of the player character A when the nice point of the player character A reaches the predetermined value. For example, when the nice point of the player character A reaches a first predetermined value while the popularity parameter of the player character A is "regular", the parameter updating unit 150 changes the popularity parameter of the player character A to "star." Further, when the nice point of the player character A reaches a second predetermined value (value greater than the first predetermined value) while the popularity parameter of the player character A is "star", the parameter updating unit 150 changes the popularity parameter of the player character A to "superstar."

In the above described first and second baseball games, the basic ability parameter and the special ability parameter of the player character also correspond to an example of "parameter." As such, when the nice point of the player character A reaches the predetermined value, the parameter updating unit 150 may update the basic ability parameter of the player character A to improve the basic ability of the player character A, or update the special ability parameter of the player character A to have the player character A acquire a new special ability.

For example, when the player character A created by the user A in the first baseball game (an example of the game object associated with the second user identification information) is selected by the selecting unit 120 and provided to the user B (an example of the first user), the parameter updating unit 150 may update the parameter of the player character A based on the result of use of the player character A in the second baseball game played by the user B.

Here, "use of the player character" and "result of use" are the same as those in the case of the first reward associating unit 140.

"To update the parameter of the player character based on the result of use of the player character" is to determine whether to update the parameter of the player character based on the result of use of the player character. For example, "to update the parameter of the player character based on the result of use of the player character" is to determine whether to update the parameter of the player character based on whether the result of use of the player character satisfies the predetermined condition.

Alternatively, "to update the parameter of the player character based on the result of use of the player character" may be to determine a degree of updating of the parameter of the player character based on the result of use of the player character. For example, "to update the parameter of the player character based on the result of use of the player character" may be to determine the degree of updating of the parameter of the player character based on whether the result of use of the player character satisfies the predetermined condition. For example, in a case where the result of use of the player character satisfies the predetermined condition, the degree of updating of the parameter of the player character may be greater than that in a case where the result of use of the player character does not satisfy the predetermined condition.

In the above described first and second baseball games, the number of times the player character is used (see FIG. 11) corresponds to an example of "result of use of the player character." As such, the parameter updating unit 150 may update the popularity parameter (or basic ability parameter, special ability parameter) of the player character A when the number of times the player character A is used reaches the predetermined value.

In the above described first and second baseball games, the performance of the player character (see FIG. 11) also corresponds to an example of "result of use of the player character." As such, the parameter updating unit 150 may update the popularity parameter (or basic ability parameter, special ability parameter) of the player character A when the number of hits (or home runs, RBIs, stolen bases, wins, saves, strikeouts) of the player character A reaches the predetermined value.

Next, the display control unit 160 will be described.

In a case where the game object associated with the second user identification information is associated with each of plural pieces of user identification information, the display control unit 160 performs control for displaying, on the display means, information about the result of use of the game object in the games respectively played by the users.

Here, "display means" is, for example, a display device included in a terminal used by a user. For example, examples of "display means" include a display unit of an arcade game machine, a portable game machine, a mobile phone (including smartphone), a tablet computer, or a laptop computer. Alternatively, "display means" is, for example, a display device connected to a terminal used by a user. For example, a display device connected to a stationary game machine or a desktop computer also corresponds to an example of "display means."

"To perform control for displaying information on the display means" is, for example, to generate a screen image indicating information and display the generated information on the display means. Alternatively, "to provide control for displaying information on the display means" is, for example, to send data of the screen image indicating the information to a terminal device of the user. The "data of the screen image" may be data indicating the screen image itself, or data for generating the screen image.

"Information about the result of use of the game object" is, for example, statistic information about the result of use of the game object. The "statistic information" is, for example, information obtained by aggregating numerical values regarding the result of use of the game object. For example, the number of times the game object is used corresponds to an example of "statistic information."

For example, in a case where the game object is a player character of a baseball game, examples of "statistic information" include the total number of hits (or home runs, RBIs, stolen bases, wins, saves, strikeouts).

In a case where the game object is a player character of a soccer game, examples of "statistic information" include total scores (or assists, lost, points).

In a case of where the game object is a game character that battles against enemies, examples of "statistic information" include the number of defeated enemies (or amount of damage to the enemies, the number of specific enemies that are beaten).

The "information about the result of use of the game object" may be information other than the statistic information. For example, the "information about the result of use of the game object" may be simply information indicating whether the game object is used.

In the above described first and second baseball games, the display control unit 160 performs control for displaying the lottery result screen image G500 on the display unit 55 of the second game terminal 50. For example, in a case where the player character A created by the user A in the first baseball game is provided to plural users and used, the area A504 of the lottery result, screen image G500 displays information about performance (the number of hits, home runs, RBIs, stolen bases, wins, saves, strikeouts) of the player character A in second baseball games played by those users as "information about the result of use of the player character A."

Next, the second reward associating unit 170 will be described.

In a case where the game character associated with the second user identification information is associated with each of plural pieces of user identification information and information about the performance of the game character in the games respectively played by the users satisfies the predetermined condition, the second reward associating unit 170 associates a reward with at least one of the pieces of user identification information or the second user identification information.

Here, "to associate a reward with user identification information" and "reward" are the same as those in the case of the first reward associating unit 130.

The "information about the performance of the game character" is, for example, statistic information of the performance of the game character. Here, "statistic information" is, for example, information obtained by aggregating numerical values of the performance of the game character.

For example, in a case of a player character of a baseball game, examples of "statistic information" include the total number of hits (or home runs, RBIs, stolen bases, wins, saves, strikeouts).

For example, in a case of a player character of a soccer game, an example of "statistic information" corresponds to the total of scores (or assists, lost points).

For example, in a case of a game character that battles against enemies, an example of "statistic information" corresponds to the number of defeated enemies (or amount of damage to the enemies, the number of specific enemies that are beaten).

The "statistic information" may be information other than the total numbers, and "information about the performance of the game character" may be information other than statistic information.

For example, when the status of information about the performance is changed from not satisfying the predetermined condition to satisfying the predetermined condition by the performance of the game character in a game played by one of the users, the second reward associating unit 170 associates a reward with user identification information that identifies the one of the users.

For example, in a case of a player character of a baseball game, "when the status of information about the performance of the game character is changed from not satisfying the predetermined condition to satisfying the predetermined condition" is when the total number of hits (or home runs, RBIs, stolen bases, wins, saves, strikeouts) of the player character reaches the predetermined value.

For example, in a case of a player character of a soccer game, "when the status of information about the performance of the game character is changed from not satisfying the predetermined condition to satisfying the predetermined condition" is when the total number of scores (or assists etc.) of the player character reaches the predetermined value.

For example, in a case of a game character that battles against enemies, "when the status of information about the performance of the game character is changed from not satisfying the predetermined condition to satisfying the predetermined condition" is when the total number of enemies beaten by the game character (or amount of damage to the enemies, the number of specific enemies that are beaten etc.) reaches the predetermined value.

Further, "when the status of information about the performance of the game character is changed from not satisfying the predetermined condition to satisfying the predetermined condition by the performance of the game character in a game played by one of the users" is a case where the information about the performance does not satisfy the predetermined condition before the user starts the game, and, after the user starts playing the game, due to the performance of the game character in the game, the information about the performance is changed in a way to satisfy the predetermined condition.

In the above described first and second baseball games, the "predetermined value" of hits include rounded numbers, such as 500, 1000, 1500, and 2000. As such, in a case where the player character A created by the user A in the first baseball game is provided to plural users including the user B in the second baseball game, the second reward associating unit 170 provides the user B with a reward when the total number of hits of the player character A turns to "2000" from "1999" by a hit of the player character A in the second baseball game played by the user B. In this case, a game item or a game point usable in the second baseball game is given as a reward. For example, a game item or a game point necessary for a lottery for acquiring a player character is given as a reward. For example, a game item that helps to win a game (e.g., a game item to improve a player's condition) is given as a reward.

In the case described above, the second reward associating unit 170 may provide a reward to other users provided with the player character A (users other than user B).

In the case described above, the second reward associating unit 170 may provide a reward to the user A who is a creator of the player character A. In this case, a game item or a game point usable in the first baseball game may be given as a reward.

5. Processing

Next, processing executed in the game system 1 for implementing the functional block mentioned above will be described.

Figure 13:
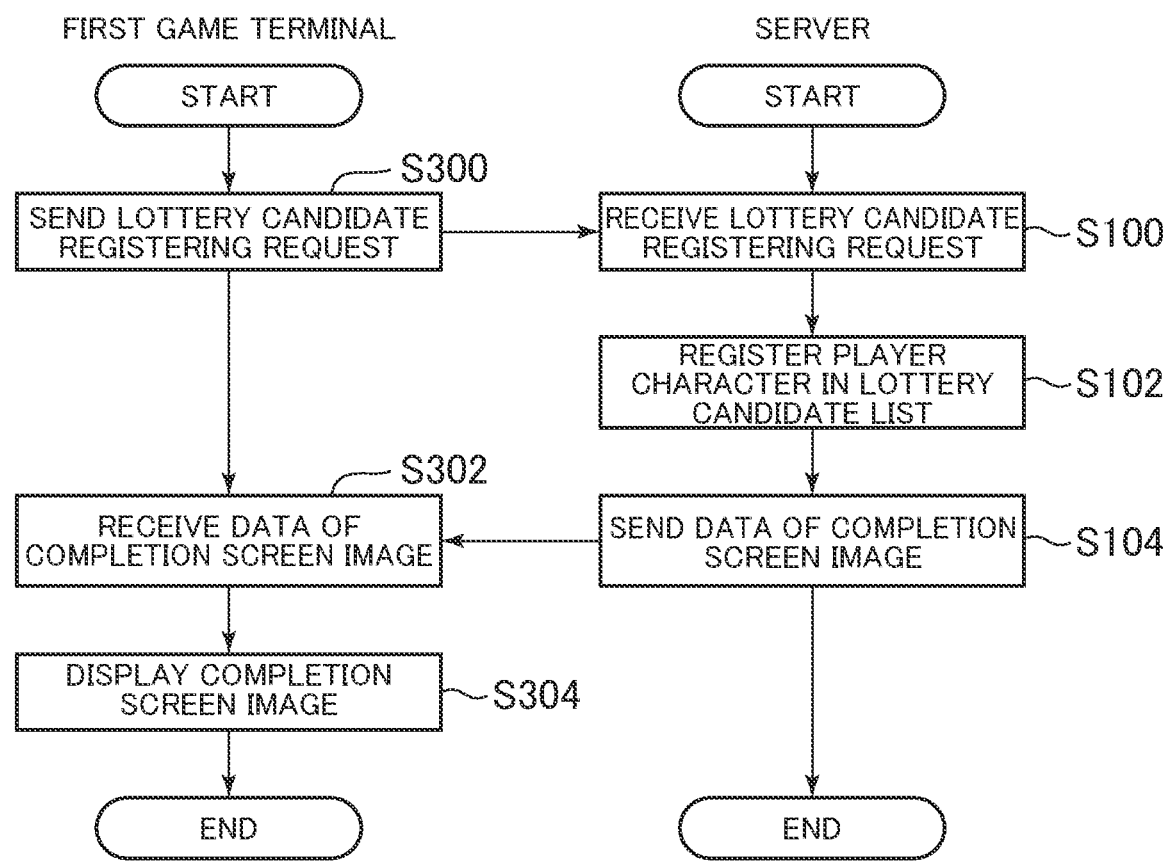
FIG. 13 is a diagram illustrating an example of processing executed in the game system.

FIG. 13 shows an example of the processing executed when a user who plays the first baseball game selects the processing object P317 on the register screen image G310. When the control unit 11 of the server 10 executes the processing shown in FIG. 13 according to a program, the control unit 11 functions as the selection candidate setting unit 110.

In the following, the processing shown in FIG. 13 will be described assuming that the user A selects the processing object P317 on the register screen image G310 displaying the player character A. In other words, suppose that the user A registers the player character A in the lottery candidate list of the second baseball game. In this regard, the user ID of the user A is "U1", and the first player character ID of the player character A is "FC1."

As shown in FIG. 13, the control unit 31 of the first game terminal 30 sends a lottery candidate registering request to the server 10 through the communication unit 33 (S300), and the control unit 11 of the server 10 receives the request through the communication unit 13 (S100).

The "lottery candidate registering request" is a request to register a player character created in the first baseball game in the lottery candidate list of the second baseball game. For example, the first game terminal 30 sends the user ID (U1) of the user A and the first player character ID (FC1) of the player character A to the server 10 as the lottery candidate registering request.

Upon receiving the lottery candidate registering request, the control unit 11 registers the player character A, which is a target of lottery candidate registration, in the lottery candidate list (S102).

For example, the control unit 11 accesses the first player character table TBL102 to check a value of a "lottery candidate flag" field of the record where "FC1" is registered in the "first player character ID" field.

Although omitted in FIG. 13, if the value of the "lottery candidate flag" field is already "1", the player character is already registered in the lottery candidate list, and thus the control unit 11 sends screen image data Indicating such information to the first game terminal 39.

If the value of the "lottery candidate flag" field is "0", the control unit 11 updates the value of the "lottery candidate flag" field to "1." The control unit 11 adds a new record to the use result table TBL105, and registers "FC1" in a "first player character ID" field of the record. Further, the control unit 11 initially registers "regular" in the "popularity" field of the record, and registers initial value (0) in the fields of "nice point", "number of uses", and "performance" of the record.

After step S102 is completed, the control unit 11 sends data of a completion screen image indicating the completion of registration in the lottery candidate list to the first game terminal 30 through the communication unit 13 (S104), and the control unit 31 of the first game terminal 30 receives the data through the communication unit 33 (S302). The control unit 31 then displays the completion screen image on the display unit 35 based on the received data (S304). The data of the completion screen image may be data indicating a completion screen image itself, or data indicating information for generating the completion screen image.

Figure 14:
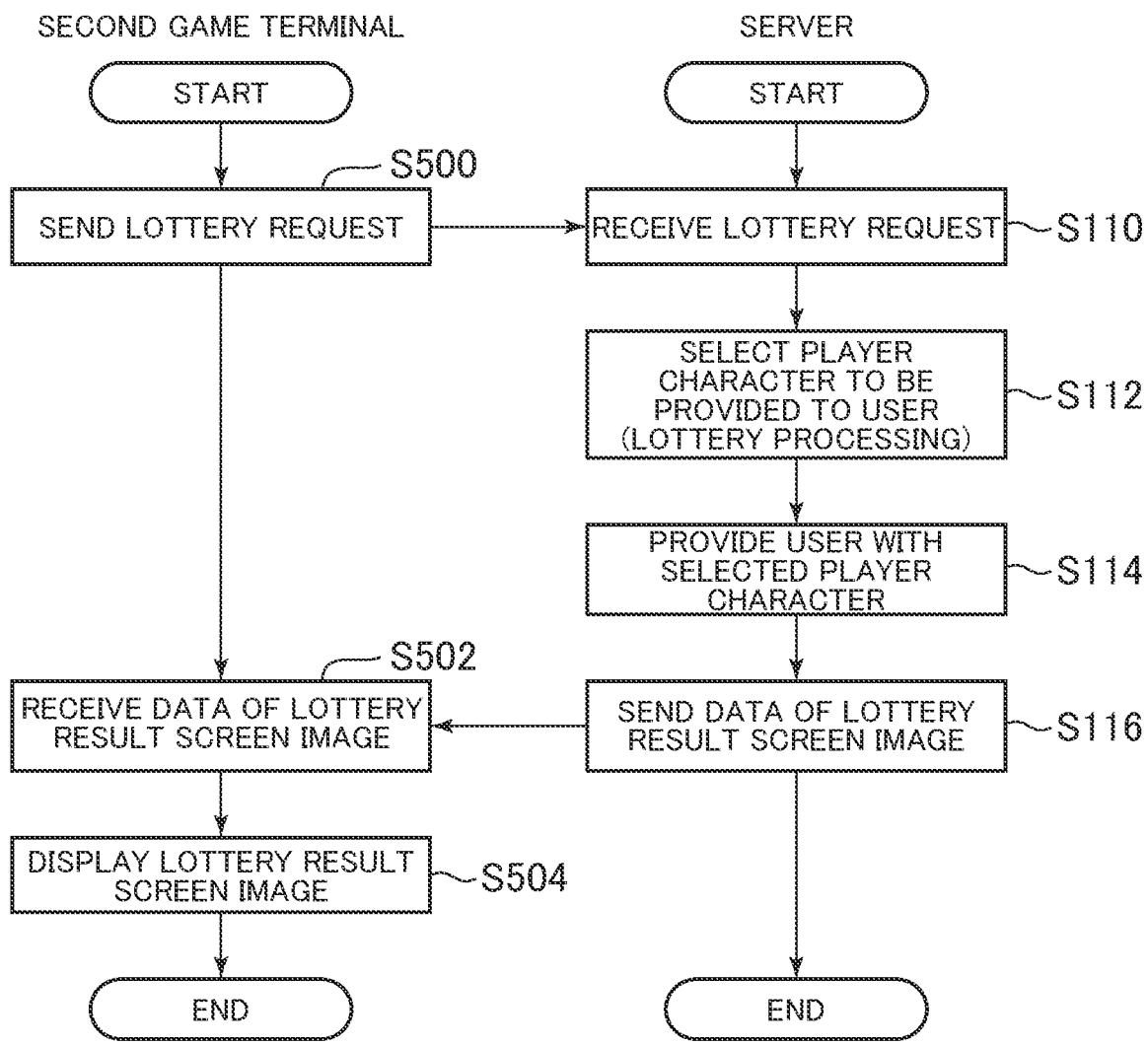
FIG. 14 is a diagram illustrating an example of another processing executed in the game system.

FIG. 14 shows an example of processing that is executed when a user who plays the second baseball game requests a lottery of a player character. When the control unit 11 of the server 10 executes the processing shown in FIG. 14 in accordance with a program, the control unit 11 functions as the selecting unit 120, the game object associating unit 130, and the display control unit 160. In the following, the processing shown in FIG. 14 will be described assuming that the user B requests a lottery of a player character. The user ID of the user B is "U2."

As shown in FIG. 14, the control unit 51 of the second game terminal 50 sends a lottery request to the server 10 through the communication unit 53 (S500), and the control unit 11 of the server 10 receives the request through the communication unit 13 (S110).

The "lottery request" is a request to execute a lottery for giving player characters to users. For example, the user ID (U2) of the user B who requests for a lottery is sent to the server 10 from the second game terminal 50 as a lottery request.

Upon receiving the lottery request, the control unit 11 selects a player character to be provided to the user B based on the lottery processing (S112).

For example, the control unit 11 accesses the first player character table TBL102, and selects one of the player characters having the lottery candidate flag "1" based on the predetermined probability. The control unit 11 may select one of the player characters registered in the use result table TBL105 based on the predetermined probability. If there is a player character created by the user B when the user B plays the first baseball game, such a player character may not be selected.

After step S112 is completed, the control unit 11 provides the user B with the player character selected in step S112 (S114).

For example, in a case where the first player character ID of the player character selected in step S112 is "FC1", the control unit 11 accesses the first player character table TBL102 and reads information about the player character having the first player character ID "FC1."

Then, the control unit 11 adds a new record to the second player character table TBL104, and registers the retrieved information in the record. At this time, a newly and automatically generated second player character ID is registered in the "second player character ID" field, the user ID (U2) of the user B is registered in the "owner" field, and the first player character ID (FC1) of the player character selected in step S112 is registered in the "first player character ID" field. In this case, while the information about the player character having the first player character ID "FC1" remains in the first player character table TBL102, a copy of the information is registered in the second player character table TBL104. In other words, while the creator owns the player character having the first player character ID "FC1" in hand, a copy of the player character is provided to the user B.

Further, the control unit 11 executes the processing of consuming game items or game points used for the lottery. For example, the control unit 11 accesses the second user table TBL103 to remove the game item used for the lottery from the game items owned by the user B, or to reduce the game point used for the lottery from the game points owned by the user B.

After step S114 is completed, the control unit 11 sends data of the lottery result screen image G500, which indicates information about the player character provided to the user B in step S114, to the second game terminal 50 through the communication unit 13 (S116), and the control unit 51 of the second game terminal 50 receives the data through the communication unit 53 (S502). The control unit 51 then displays, the lottery result screen image G500 on the display unit 55 based on the data (S504).

The data of the lottery result screen image G500 may be data indicating the lottery result screen image G500 itself, or data indicating information necessary for generating the lottery result screen image G500. The data of the lottery result screen image G500 is generated based on information registered in the second player character table TBL104 and the use result table TBL105.

Figure 15:
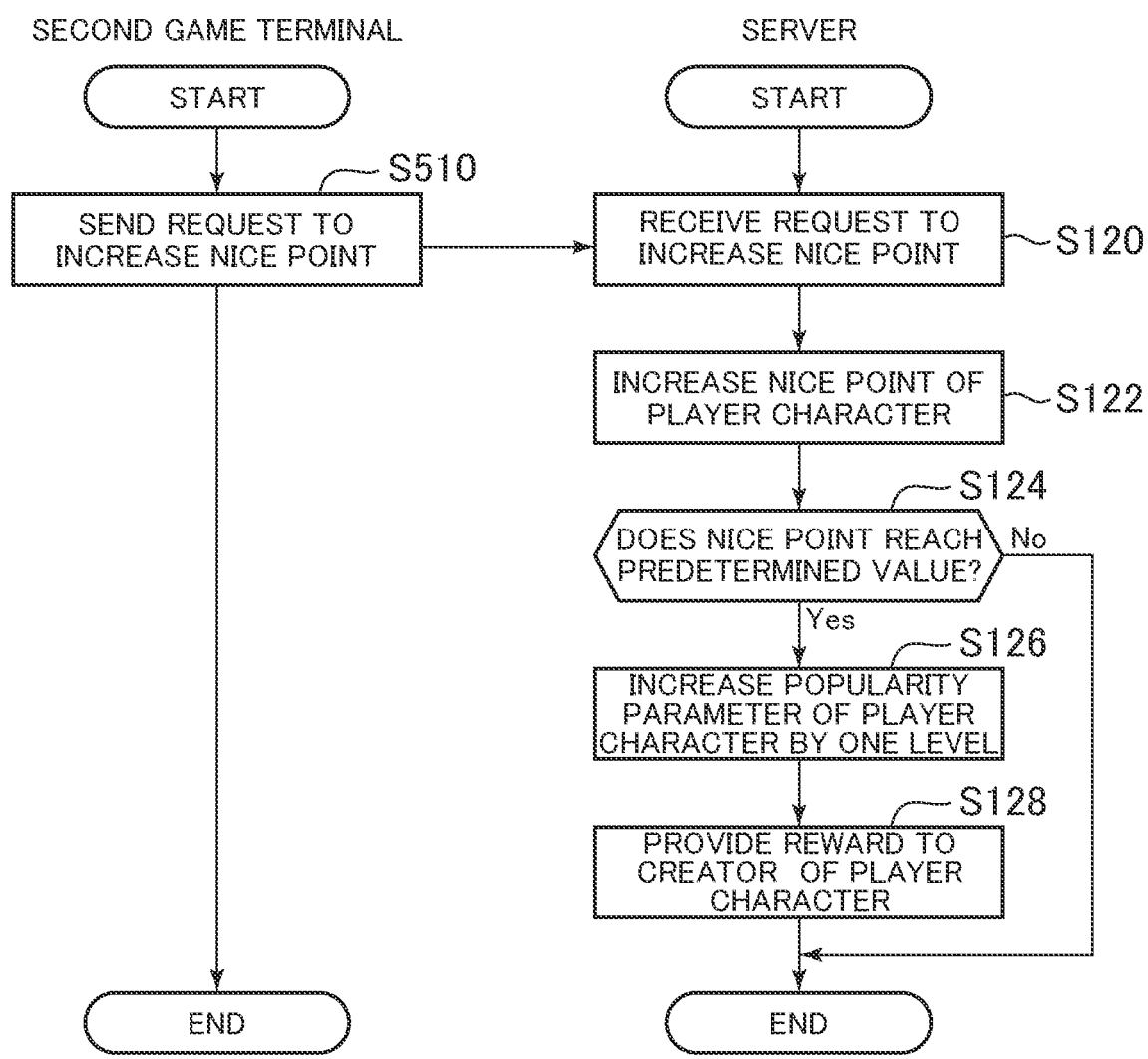
FIG. 15 is a diagram illustrating an example of yet another processing executed in the game system.

FIG. 15 shows an example of processing executed when a user playing the second baseball game selects a nice button (processing object P513) on the match screen image G510. When the control unit 11 of the server 10 executes the processing shown in FIG. 15 in accordance with a program, the control unit 11 functions as the first reward associating unit 140 and the parameter updating unit 150.

In the following, the processing shown in FIG. 15 will be described assuming that the user B selects the nice button on the match screen image G510 in a scene where the player character A operated by the user B makes a hit. Suppose that the user ID of the user B is "U2", and the second player character ID of the player character A is "SC2."

As shown in FIG. 15, the control unit 51 of the second game terminal 50 sends a request to increase nice points to the server 10 through the communication unit 53 (S510), and the control unit 11 of the server 10 receives the request through the communication unit 13 (S120).

"Request to increase nice points" is to request to increase nice points of the player character. For example, the user ID (U2) of the user B who selects the nice button and the second player character ID (SC2) of the player character A to which the nice button is directed are sent from the second game terminal 50 to the server 10 as the request to increase nice points.

Upon receiving the request to increase nice points, the control unit 11 increases the nice points of the player character A to which the nice button is directed (S122).

For example, the control unit 11 accesses the second player character table TBL104 and obtains a first player character ID (FC1) of the player character A having the second player character ID "SC2." The control unit 11 then accesses the use result table TBL105, and increases the nice points of the player character having the first player character ID "FC1" by one point.

After step S122 is completed, the control unit 11 determines whether the increased nice points reach the predetermined value (S124). If the increased nice points do not reach the predetermined value, the control unit 11 terminates the processing.

If the increased nice points reach the predetermined value, the control unit 11 accesses the use result cable TBL105 and increases the popularity parameter of the player character A by one level (S126). Further, the control unit 11 provides a reward to the user who is a creator of the player character A (S128). For example, the control unit 11 accesses the first player character table TBL102, and obtains a user ID of the creator of the player character A. The control unit 11 accesses the first user table TBL101 to increase the value in the "game point" field of the record in which the obtained user ID is registered in the "user ID" field, or to add a game item ID to the "game item" field of such a record, thereby providing a game point or a game item to the creator of the player character A.

The processing shown in FIG. 15 may be executed after each at-bat of the player character. In step S128, if a reward is provided to the creator of the player character A, the creator of the player character A may be so notified. For example, when the creator of the player character A next accesses the game system 1 (e.g., when the creator of the player character A next plays the first baseball game), a message indicating that a reward is provided may be output. Alternatively, a message indicating that a reward is provided may be sent to an address of the creator of the player character A. This approach can give satisfaction to the creator of the player character, and thereby motivating the creator to create another player character.

Figure 16:
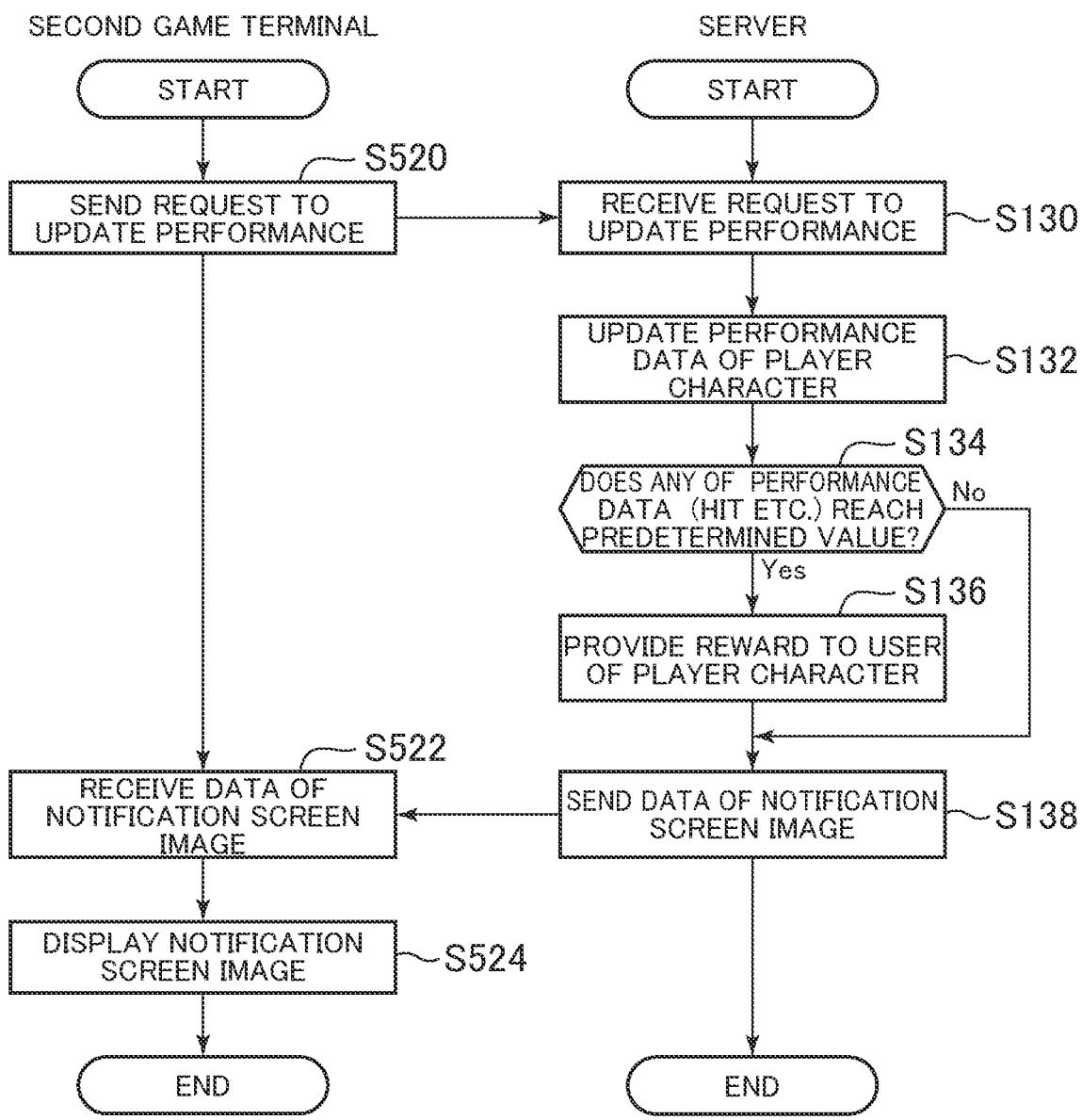
FIG. 16 is a diagram illustrating an example of further processing executed in the game system.

FIG. 16 shows an example of processing executed when a baseball match between the user who plays the second baseball game and the opponent is ended. When the control unit 11 of the server 10 executes the processing shown in FIG. 16 in accordance with a program, the control unit 11 functions as the second reward associating unit 170. In the following, the processing shown in FIG. 16 will be described assuming that a baseball match between the user B and the opponent is ended. Suppose that the user ID of the user B is "U2."

As shown in FIG. 16, the control unit 51 of the second game terminal 50 sends a request to update a player character's performance to the server 10 through the communication unit 53 (S520), and the control unit 11 of the server 10 receives the request through the communication unit 13 (S130).

"Request to update a player character's performance" is a request to update performance data (e.g., total number of hits, home runs, RBIs, stolen bases, wins, saves, strikeouts) of a player character who participates in a baseball match. For example, the second game terminal 50 sends the user ID (U2) of the user B who plays the match, the second player character ID of the player character who participates in the match, and the performance (e.g., number of hits, and the like) of the player character who participates in the match to the server 10 as the request to update the player character's performance. In the description below, assume a case where a request to update the performance of the player character A participating in the match is received. Suppose that the second player character ID of the player character A is "SC2."

Upon receiving the request to update the performance of the player character A, the control unit 11 updates the performance data of the player character A (S132).

For example, the control unit 11 accesses the second player character table TBL104 to obtain the first player character ID (FC1) of the player character A having the second player character ID "SC2." The control unit 11 then accesses the use result table TBL105 and updates performance data (e.g., number of hits and the like) of the player character A having the first player character ID "FC1." For example, in a case where the player character A makes two hits in the game, a value of 2 is added to the number of hits of the player character A.

After step S132 is completed, the control unit 11 determines whether any of the performance data of the player character A, such as the number of hits, reaches the predetermined value (S134). In the case of the number of hits, for example, "predetermined value" includes rounded numbers such as 500, 1000, 1500, and 2000.

When any of the performance data of the player character A, such as the number of hits, reaches the predetermined value, the control unit 11 provides a reward to the user B who is a user of the player character A (S136). For example, the control unit 11 accesses the second user table TBL103 to increase the value in the "game point" field of the record in which "U2" is registered in the "user ID" field, or to add a game item ID to the "game item" field of such a record, thereby providing a game point or a game item to the user B.

After step S136 is completed, the control unit 11 sends data of a notification screen image for notifying the user B of the performance data of updated player characters, the reward provided to the user B, and the like, for example, to the second game terminal 50 through the communication unit 13 (S138), and the control unit 51 of the second game terminal 50 receives the data through the communication unit 53 (S522). The control unit 51 then displays the notification screen image on the display unit 55 based on the received data. (S524). The data of the notification screen image may be data indicating the notification screen image itself, or data indicating information necessary for generating the notification screen image.

In the above described game system 1, a player character created by the user who plays the first baseball game is registered in the lottery candidate list (list of candidates of player characters that can be provided by lottery to users who play the second baseball game) of the second baseball game. As a result, even if the game provider does not create new player characters, a lineup in the lottery candidate list of the second baseball game changes. As such, according to the game system 1, it is possible to vary the lineup in the lottery candidate list of the second baseball game while preventing increase in the workload of the game provider.

In the game system 1, in response to a request from a user, a player character created by the user in the first baseball game is registered in the lottery candidate list of the second baseball game. This configuration enables users to select whether to register player characters created by them in the lottery candidate list.

In the game system 1, when the player character A created by the user A in the first baseball game is provided to other user in the second baseball game, a reward is given to the user A who is the creator of the player character under the predetermined condition. This can provide the users of the first baseball game with motivation to register player characters created by them in the lottery candidate list of the second baseball game, and to create a player character that can receive many nice points from other users.

In the game system 1, the user B receives a reward when the player character A used by the user B makes a hit in a baseball match between the user B and the opponent and the total number of hits of the player character A reaches the predetermined value (e.g., 500, 1000, 1500, 2000). This can provide users of the second game with motivation to use player characters to play games.

In the game system 1, a user refers to areas A504, A507, and A508 of the lottery result screen image G500, thereby grasping information about a player character provided to the user by lottery, such as evaluation and popularity of the player character from other users of the player character and how the player character plays when other users use the player character. That is, the user can estimate whether the player character provided by lottery is useful or whether the player character is expected to play well based on the information.

In the game system 1, the first baseball game and the second baseball game interact with each other. As such, for example, it is possible to encourage users who have played the first baseball game to also play the second baseball game, and encourage users who have played the second baseball game to also play the first baseball game.

That is, it is possible to encourage users who have played the first baseball game provided on a smartphone (mobile phone) to also play the second game provided by an arcade game machine installed in amusement facilities, for example. In general, a user can play a game on a smartphone anytime and anywhere, while in order to play a game in amusement facilities, a user needs to go the amusement facilities in business hours, which gives temporal and locational restriction on the user. As such, if games are similar to each other in content, users tend to play the game on smartphones, not in amusement facilities, which is considered to be a cause of a drop in the number of customers in amusement facilities. In this regard, according to the game system 1, the users can be motivated to also play games in amusement facilities.

6. Variations

The present invention is not limited to the above described embodiments.

[6-1] The nice button (processing object P513) may be displayed on a replay screen image for displaying replay video, or on a match result screen image displayed after a baseball match. With this configuration, a user may select a nice button while viewing replay video or match results.

[6-2] A screen image including content displayed on the area A504 of the lottery result screen image G500 may be displayed on a first game terminal 30 (or second game terminal 50) of a user who is a creator of a player character. This enables the user who creates the player character to know whether the player character created by the user is useful (plays well) in games played by other users.

[6-3] In the first baseball game, a user may use player characters created by the user to organize a baseball team to play a baseball match with an opponent.

In this case, in a case where the player character A created by the user A in the first baseball game is selected by the selecting unit 120 and provided to the user B, the parameter updating unit 150 may update a parameter of the player character A used in the first baseball game (e.g., basic ability parameter or special ability parameter stored in the first player character table TBL102) based on the evaluation of the player character A by the user B (or based on result of use of the player character A by the user B). With this configuration, the ability of the player character A used by the user A in the first baseball game may be improved based on the evaluation of the player character A by the user B in the second baseball game.

[6-4] The first baseball game and the second baseball game may be executed in a single game terminal. The first baseball game and the second baseball game may not necessarily be separate games, but be parts of a single game. In other words, the first baseball game may be a part of a baseball game executed by a game program, and the second baseball game may be the other part of the baseball game.

[6-5] In the above description, the example where the present invention is applied to the baseball-themed games is mainly described, but the present invention may be applied to other games. That is, the present invention may be applied to games other than baseball-themed games. The first game and the second game may have different themes.

The present, invention may be applied to "a game for selecting at least one game object from game objects which are selection candidates, as a game object to be provided to a user, based on predetermined lottery processing, and providing the user with the selected game object." For example, the present invention may be applied to "a game in which a user is provided with a game character that is selected from selection candidate game characters based on lottery processing, and organizes a team (e.g., group) using the provided game characters to play a match with an opponent" and "a game in which a user is provided with a game card that is selected from selection candidate game cards based on lottery processing, and creates a deck using the provided game cards to play a match with an opponent."

7. Appendixes

From the foregoing, the present invention will be understood as described below, for example. In the following, the numerals given in accompanying drawings are shown in parentheses for the purpose of easier understanding, although the invention is not limited to the embodiments shown in the drawings.

1) A game system (1) according to an aspect of the present, invention includes selecting means (120) for selecting at least one game object, from a plurality of selection candidate game objects (e.g., player characters), as a game object to be associated with first user identification information, based on predetermined lottery processing, game object associating means (130) for associating the game object selected by the selecting means (120) with the first user identification information, and selection candidate setting means (110) for setting, as one of the plurality of selection candidate game objects, a game object which is associated with second user identification information and created based on a game play of a second user who is identified by the second user identification information.

13) A game control device (10) according to an aspect of the present invention for performing control for a game in which at least one game object is selected from a plurality of selection candidate game objects, as a game object to be associated with first user identification information, based on predetermined lottery processing and the selected game object is associated with the first user identification information, includes selection candidate setting means (110) for setting, as one of the plurality of selection candidate game objects, a game object which is associated with second user identification information and created based on a game play of a second user who is identified by the second user identification information.

14) A program according to an aspect of the present invention causes a computer to function as the game system (1) according to any one of 1) to 12) or the game control device (10) according to 13).

15) An information storage medium according to an aspect of the present invention is a computer-readable information storage medium that stores the program according to 14).

16) A method for controlling a game system (1) according to an aspect of the present invention includes selecting step (S112) for selecting at least one game object from a plurality of selection candidate game objects, as a came object to be associated with first user identification information, based on predetermined lottery processing, game object associating step (S114) for associating the game object selected in the selecting step (S112) with the first user identification information, and selection candidate setting step (S102) for setting, as one of the plurality of selection candidate game objects, a game object which is associated with second user identification information and created based on a game play of a second user who is identified by the second user identification information.

17) A method for controlling a game control device (10) according to an aspect of the present invention performs control for a game in which at least one game object is selected from a plurality of selection candidate game objects, as a game object to be associated with first user identification information, based on predetermined lottery processing and the selected game object is associated with the first user identification information, wherein the method includes selection candidate setting step (S102) for setting, as one of the plurality of selection candidate game objects, a game object which is associated with second user identification information and created based on a game play of a second user who is identified by the second user identification information.

According to the invention described in above 1) and 14) to 17), a game object created based on a game play of a user is set as a selection candidate game object. As such, a lineup of selection candidate game objects varies even if a game provider does not create a new game object, and thus it is possible to reduce workload of the game provider to vary the lineup of selection candidate game objects.

2) In an aspect of the present invention, in a case where a predetermined setting request (e.g., lottery candidate registering request) is received from the second user, the selection candidate setting means (110) may set the game object associated with the second user identification information as one of the selection candidate game objects.

According to the invention described in 2), in a case where request is received from a user, a game object created based on the game play of the user is set as a selection candidate game object, and thus the user can select whether to set the game object created based on his/her game play as the selection candidate game object.

3) In an aspect of the present invention, the game system may also include reward associating means (140) for associating a reward with the second user identification information, in a case where the game object associated with the second user identification information is selected by the selecting means (120) and associated with the first user identification information.

According to the invention described in 3), in a case where a game object created based on a game play of a user is provided to other user, the user is provided with a reward. As a result, the user can be motivated to set the game object created based on his/her game play as a selection candidate game object.

4) According to an aspect of the present invention, in a case where the game object associated with the second user identification information is selected by the selecting means (120) and associated with the first user identification information, the game object may be made available for use in a game played by the first user identified by the first user identification information. The reward associating means (140) may include means for associating a reward with the second user identification information based on the result of use of the game object in the game played by the first user, in a case where the game object associated with the second user identification information is selected by the selecting means (120) and associated with the first user identification information.

According to the invention described in 4), in a case where the game object created based on a game play of a user is given to other user, the user is provided with a reward based on the result of use of the game object in the game played by other user. As a result, the user can be motivated to create a game object that can acquire a reward and set the game object as a selection candidate game object.

5) In an aspect of the present invention, the reward associating means (140) may include means for associating a reward with the second user identification information based on evaluation of the game object by the first user, in a case where the game object associated with the second user identification information is selected by the selecting means and associated with the first user identification information.

According to the invention described in 5), a game object created based on a game play of a user is given to other user, the user is provided with a reward based on evaluation of the game object by other user. As a result, the user can be motivated to create a game object that can receive good evaluation from other users and set the game object as a selection candidate game object.

6) In an aspect of the present invention, in a case where the game object associated with the second user identification information is selected by the selecting means (120) and associated with the first user identification information, the game object may be made available for use in a game played by the first user identified by the first user identification information. The game system may further include means (150) for updating a parameter of the game object associated with the second user identification information based on a result of use of the game object in the game played by the first user, in a case where the game object associated with the second user identification information is selected by the selecting means (120) and associated with the first user identification information.

According to the invention described in 6), in a case where a game object created based on a game play of a user is given to other user, a parameter of the game object of the user is updated based on a result of use of the game object in a game played by other user. The game object created by the user is still owned by the user after the game object is given to other user, and thus the user who has created the game object can improve the parameter of the game object in hand based on the result of use of the game object by other users simply by keeping the game object without any effort. In other words, the user can improve the parameter of the game object in his/her hand with the assistance of other users simply by setting the game object as a selection candidate game object. As a result, the user can be motivated to create a game object that can update a parameter and set the game object as a selection candidate game object.

7) In an aspect of the present invention, the game system may further include means (150) for updating a parameter of a game object associated with the second user identification information based on evaluation of the game object by the first user, in a case where the game object associated with the second user identification information is selected by the selecting means (120) and associated with the first user identification information.

According to the invention described in 7), in a case where a game object created based on a game play of a user is given to other user, a parameter of the game object of the user is updated based on evaluation of the game object by other users. The game object created by the user is still owned by the user after the game object is given to other user, and thus the user who has created the game object can improve the parameter of the game object based on the evaluation of the game object by other users simply by keeping the game object without any effort. In other words, the user can improve the parameter of the game object in his/her hand with the assistance of other users simply by setting the game object as a selection candidate game object. As a result, the user can be motivated to create a game object that can obtain good evaluation from other users and set the game object as a selection candidate game object.

8) In an aspect of the present invention, a game object associated with the second user identification information may be associated with each of pieces of user identification information other than the second user identification information. In a case where the game object associated with the second user identification information is associated with each of the pieces of user identification information, the game object may be made available for use in the games respectively played by a plurality of users identified by the pieces of user identification information. The game system (1) may include display control means (160) for performing control for displaying information (e.g., A504) about the result of use of the game object in the games respectively played by the plurality of users on display means (55) in a case where the game object associated with the second user identification information is associated with each of the pieces of user identification information.

According to the invention described in 8), in a case where a game object created based on a user X's game play is given to some of other users, information about the result of use of the game object in the games respectively played by the users is displayed. As a result, the users can obtain information about the result of use of the game object in games that are played by other users. This information provides the user X with an advantage in, for example, determining whether the game object is useful. Alternatively, the user X can obtain information about the result of use of the game object generated based on the user X's game play in the games respectively played by other users. This information provides the user X with an advantage in, for example, grasping whether the game object created based on the user X's game play is useful in the games respectively played by the other users.

9) In an aspect of the present invention, the game object may be a game character. The information about the result of use may include information (e.g., A504) about the performance of the game character in the games respectively played by the plurality of users.

According to the invention described in 9), in a case where the game character generated based on the user X's game play is given to some of other users, information about the performance of the game character in the games respectively played by the users is displayed. As a result, for example, the users can assume whether the game object is expected to play well based on the information. Alternatively, for example, the user X can grasp whether the game character created based on the user X's game play plays well in the games respectively played by the other users based on the information.

10) In an aspect of the present invention, the game object may be a game character. The game character associated with the second user identification information may be associated with each of pieces of user identification information other than the second user identification information. The game character may be made available for use in the games respectively played by the users identified by the pieces of user identification information, in a case where the game character is associated with the second user identification information is associated with each of the pieces of user identification information. The game system (1) may include second reward associating means (170) for associ-ating a reward with at least one of the pieces of user identification information or the second user identification information, in a case where the game character associated with the second user identification information is associated with each of the pieces of user identification information and information about the performance of the game character in the games respectively played by the users satisfies a predetermined condition (e.g., when the total number of hits of the player character reaches a predetermined value).

According to the invention described in 10), in a case where a game character created based on the user X's game play is given to some of other users and information about the performance of the game character in the games respectively played by the other users satisfies a predetermined condition, a reward is provided to at least one of the other users or the user X. As a result, for example, the other users can be motivated to use the game character to make good performance. Alternatively, for example, the user X may be motivated to create a game character that performs well, and sets the game character as a selection candidate game object.

11) In an aspect of the present invention, in a case where the status of information about the performance of the game character is changed from not satisfying the predetermined condition (e.g., the total number of hits of the player character does not reach the predetermined value) to satisfying the predetermined condition (e.g., the total number of hits of the player character reach the predetermined value) by the performance of the game character in a game played by one of the plurality of users, the second reward associating means (170) may associate a reward with user identification information that identifies the one of the plurality of users.

According to the invention described in 11), in a case where the game character created based on the user X's game play is given to some of other users and the status of the information is changed from not satisfying the predetermined condition to satisfying the predetermined condition by the performance of the game character in a game played by a user Y, who is one of the other users, a reward is provided to the user Y. This can motivate the users provided with the game object to use the game character and play a game.

12) In an aspect of the present invention, the game object associated with the second user identification information may be a game object created based on a play of a first game (e.g., first baseball game) by the second user. In a case where the game object associated with the second user identification information is selected by the selecting means (120) and associated with the first user identification information, the game object may be made available for use in a second game (e.g., second baseball game), which is different from the first game and played by a first user identified by the first user identification information.

According to the invention described in 12), the first game and the second game can interact with each other. As a result, for example, it is possible to encourage a user who has played the second game to also play the first game, or to encourage a user who has played the first game to also play the second game.

For example, in a case where the first game is played on a smartphone (mobile phone), and the second game is played on an arcade game machine in amusement facilities, a user who has played the game on the smartphone can be encouraged to also play a game in amusement facilities. In a case of a game on a smartphone, a user can play the game anytime and anywhere, while in order to play a game in amusement facilities, a user needs to go the amusement facilities in business hours, which gives temporal and locational restriction on the user. As such, if games are similar to each other in content, users tend to play the games on smartphones, not in amusement facilities, which is considered to be a cause of a drop in the number of customers in amusement facilities. In this regard, as described above, the users can be motivated to also play games in amusement facilities.

While there have been described what are at present considered to be certain embodiments of the invention, it will be understood that various modifications may be made thereto, and it is intended that the appended claims cover all such modifications as fall within the true spirit and scope of the invention.

The invention claimed is:

1. A game system comprising at least one processor configured to:
   select at least one game object from a plurality of selection candidate game objects, as a game object to be associated with first user identification information, based on predetermined lottery processing;
   associate the selected game object with the first user identification information; and
   set a game object as one of the plurality of selection candidate game objects, wherein the game object is associated with second user identification information, and the game object is a game character trained by the second user or a game item upgraded by the second user, and the second user is identified by the second user identification information;
   wherein the game object is a game character,
   the game character associated with the second user identification information can be associated with each of a plurality of pieces of user identification information other than the second user identification information,
   the game character is made available for use in a plurality of games respectively played by a plurality of users identified by the pieces of user identification information, in a case where the game character associated with the second user identification information is associated with each of the pieces of user identification information, and
   the at least one processor is further configured to associate a reward with at least one of the pieces of user identification information or the second user identification information, in a case where the game character associated with the second user identification information is associated with each of the pieces of user identification information and information relating to the performance of the game character in the games respectively played by the plurality of users satisfies a predetermined condition.

2. The game system according to claim 1, wherein the at least one processor is configured to, in a case where a predetermined setting request is received from the second user, set the game object associated with the second user identification information as one of the plurality of selection candidate game objects.

3. The game system according to claim 1, wherein the at least one processor is further configured to associate a reward with the second user identification information, in a case where the game object associated with the second user identification information is selected and associated with the first user identification information.

4. The game system according to claim 3, wherein
   in a case where the game object associated with the second user identification information is selected and associated with the first user identification information, the game object is made available for use in a game played by a first user who is identified by the first user identification information, and
   the at least one processor is configured to associate a reward with the second user identification information based on a result of use of the game object in the game played by the first user, in a case where the game object associated with the second user identification information is selected and associated with the first user identification information.

5. The game system according to claim 3, wherein
   the at least one processor is configured to associate a reward with the second user identification information based on evaluation of the game object by the first user, in a case where the game object associated with the second user identification information is selected and associated with the first user identification information.

6. The game system according to claim 1, wherein
   in a case where the game object associated with the second user identification information is selected and associated with the first user identification information, the game object is made available for use in a game played by the first user who is identified by the first user identification information, and
   the at least one processor is configured to update a parameter of the game object associated with the second user identification information based on the result of use of the game object in the game played by the first user, in a case where the game object associated with the second user identification information is selected and associated with the first user identification information.

7. The game system according to claim 1, wherein
   the at least one processor is further configured to update the parameter of the game object associated with the second user identification information based on the evaluation of the game object by the first user, in a case where the game object associated with the second user identification information is selected and associated with the first user identification information.

8. The game system according to claim 1, wherein
   the game object associated with the second user identification information can be associated with each of a plurality of pieces of user identification information other than the second user identification information,
   in a case where the game object associated with the second user identification information is associated with each of the pieces of user identification information, the game object is made available for use in games respectively played by a plurality of users identified by the pieces of user identification information, and
   the at least one processor is further configured to perform control for displaying information on a display in a case where the game object associated with second user identification information is associated with each of the pieces of user identification information, the information relating to the result of use of the game object in the games respectively played by the plurality of users.

9. The game system according to claim 8, wherein
the game object is a game character, and
the information relating to the result of use includes information relating to performance of the game character in the games respectively played by the plurality of users.

10. The game system according to claim 1, wherein
the at least one processor is further configured to, in a case where the information relating to the performance is changed from not satisfying the predetermined condition to satisfying the predetermined condition by the performance of the game character in a game played by one of the plurality of users, associate a reward with user identification information that identifies the one of the plurality of users.

11. The game system according to claim 1, wherein
the game object associated with the second user identification information is a game object that is created based on a play by the second user in a first game,
in a case where the game object associated with the second user identification information is selected and associated with the first user identification information, the game object is made available for use in a second game that is different from the first game and is played by the first user identified by the first user identification information.

12. A game control device comprising at least one processor configured to:
perform control relating to a game in which at least one game object is selected from a plurality of selection candidate game objects, as a game object to be associated with first user identification information, based on predetermined lottery processing and the selected game object is associated with the first user identification information; and
set a game object as one of the plurality of selection candidate game objects, wherein the game object is associated with second user identification information, and the game object is a game character trained by the second user or a game item upgraded by the second user, and the second user is identified by the second user identification information;
wherein the game object is a game character,
the game character associated with the second user identification information can be associated with each of a plurality of pieces of user identification information other than the second user identification information,
the game character is made available for use in a plurality of games respectively played by a plurality of users identified by the pieces of user identification information, in a case where the game character associated with the second user identification information is associated with each of the pieces of user identification information, and
the at least one processor is further configured to associate a reward with at least one of the pieces of user identification information or the second user identification information, in a case where the game character associated with the second user identification information is associated with each of the pieces of user identification information and information relating to the performance of the game character in the games respectively played by the plurality of users satisfies a predetermined condition.

13. A non-transitory computer-readable information storage medium that stores a program for causing a computer to:
perform control relating to a game in which at least one game object is selected from a plurality of selection candidate game objects, as a game object to be associated with first user identification information, based on predetermined lottery processing and the selected game object is associated with the first user identification information; and
set a game object as one of the plurality of selection candidate game objects, wherein the game object is associated with second user identification information, and the game object is a game character trained by the second user or a game item upgraded by the second user and the second user is identified by the second user identification information;
wherein the game object is a game character,
the game character associated with the second user identification information can be associated with each of a plurality of pieces of user identification information other than the second user identification information,
the game character is made available for use in a plurality of games respectively played by a plurality of users identified by the pieces of user identification information, in a case where the game character associated with the second user identification information is associated with each of the pieces of user identification information, and
the program further causes the computer to associate a reward with at least one of the pieces of user identification information or the second user identification information, in a case where the game character associated with the second user identification information is associated with each of the pieces of user identification information and information relating to the performance of the game character in the games respectively played by the plurality of users satisfies a predetermined condition.

* * * * *